United States Patent
Fathpour et al.

(10) Patent No.: US 10,585,241 B2
(45) Date of Patent: Mar. 10, 2020

(54) OPTICAL WAVEGUIDE, FABRICATION METHODS, AND APPLICATIONS

(71) Applicant: UNIVERSITY OF CENTRAL FLORIDA RESEARCH FOUNDATION, INC., Orlando, FL (US)

(72) Inventors: Sasan Fathpour, Orlando, FL (US); Jeffrey Chiles, Orlando, FL (US)

(73) Assignee: UNIVERSITY OF CENTRAL FLORIDA RESEARCH FOUNDATION, INC., Orlando, FL (US)

( * ) Notice: Subject to any disclaimer, the term of this patent is extended or adjusted under 35 U.S.C. 154(b) by 0 days.

(21) Appl. No.: 16/064,537

(22) PCT Filed: Dec. 20, 2016

(86) PCT No.: PCT/US2016/067766
§ 371 (c)(1),
(2) Date: Jun. 21, 2018

(87) PCT Pub. No.: WO2017/112663
PCT Pub. Date: Jun. 29, 2017

(65) Prior Publication Data
US 2018/0372953 A1    Dec. 27, 2018

Related U.S. Application Data

(60) Provisional application No. 62/270,221, filed on Dec. 21, 2015.

(51) Int. Cl.
*G02B 6/12* (2006.01)
*G02B 6/122* (2006.01)
*G02B 6/136* (2006.01)

(52) U.S. Cl.
CPC ......... *G02B 6/1225* (2013.01); *G02B 6/1221* (2013.01); *G02B 6/136* (2013.01);
(Continued)

(58) Field of Classification Search
CPC ...... G02B 6/136; G02B 6/122; G02B 6/1225; G02B 6/1223; G02B 2006/12147;
(Continued)

(56) References Cited

U.S. PATENT DOCUMENTS 5,374,564 A      12/1994   Bruel
6,363,183 B1 *   3/2002    Koh .................. G02B 6/132
                                                       385/14

(Continued)

OTHER PUBLICATIONS

International Search Report and Written Opinion; Form PCT/ISA/210 and PCT/ISA/237; dated Feb. 20, 2017; 11 pages.
(Continued)

*Primary Examiner* — Thomas A Hollweg
*Assistant Examiner* — Mary A El-Shammaa
(74) *Attorney, Agent, or Firm* — Klintworth & Rozenblat IP LLP

(57) ABSTRACT

The present invention is an integrated photonics platform is created through the application of a polymer and silicon dioxide mask, multiple anisotropic etchings with inductively-coupled plasma reactive-ion-etching and a brief isotropic silicon etching to produce a a T-shaped silicon base wafer. A silicon-on-insulator donor wafer is bonded to the silicon base wafer a silicon dioxide layer between the two wafers is removed, producing a finalized T-shaped optical waveguide. The T-shaped optical waveguide causes confinement of the optical mode in the upper region of the "T," above the connection to the post. This shape prevents leakage of light into the silicon wafer.

18 Claims, 27 Drawing Sheets

(52) U.S. Cl.
CPC .... *G02B 6/1223* (2013.01); *G02B 2006/1215* (2013.01); *G02B 2006/12147* (2013.01); *G02B 2006/12173* (2013.01); *G02B 2006/12176* (2013.01)

(58) Field of Classification Search
CPC ........... G02B 2006/12152; G02B 2006/12173; G02B 2006/12176; G02B 2006/1215
See application file for complete search history.

(56) References Cited

U.S. PATENT DOCUMENTS

| | | | |
|---|---|---|---|
| 6,621,972 | B2 | 9/2003 | Kimerling et al. |
| 6,730,988 | B2* | 5/2004 | Leon ................ G02B 6/125 216/85 |
| 7,016,587 | B2 | 3/2006 | Kubby et al. |
| 7,469,084 | B2 | 12/2008 | Aalto |
| 7,471,866 | B2 | 12/2008 | Dumais et al. |
| 7,920,770 | B2 | 4/2011 | Holzwarth |
| 9,020,002 | B2 | 4/2015 | Sysak et al. |
| 2002/0031305 | A1* | 3/2002 | Ticknor ............... G02B 6/3502 385/48 |
| 2002/0076188 | A1* | 6/2002 | Kimerling ............ G02B 6/12 385/132 |
| 2003/0002814 | A1* | 1/2003 | Dudoff ................ G02B 6/38 385/78 |
| 2003/0113067 | A1* | 6/2003 | Koh ................... G02B 6/12004 385/48 |
| 2003/0223672 | A1* | 12/2003 | Joyner .............. G02B 6/12011 385/14 |
| 2004/0028344 | A1* | 2/2004 | Kang ................. G02B 6/12002 385/60 |
| 2007/0286552 | A1* | 12/2007 | Aalto .................... G02B 6/125 385/50 |
| 2009/0274418 | A1* | 11/2009 | Holzwarth ............ B82Y 20/00 385/30 |
| 2013/0322811 | A1 | 12/2013 | Meade |
| 2014/0264030 | A1* | 9/2014 | Lin ....................... G02B 6/136 250/338.4 |

OTHER PUBLICATIONS

Z. Cheng et al., IEEE Photonics Journal, vol. 4, No. 5., pp. 1510-1519, entitled Mid-Infrared Suspended Membrane Waveguide and Ring Resonator on Silicon-on-Insulator, dated Oct. 2012.

Jeff Chiles et al., Applied Physics Letters, vol. 103, No. 15, p. 151106, entitled High-Contrast, All-Silicon Waveguiding Platform for Ultra-Broadband Mid-Infrared Photonics, dated Oct. 8, 2013.

P.T. Lin et al., Optics Letters, vol. 38, No. 7, p. 1031, entitled Air-Clad Silicon Pedestals Structures for Broadband Mid-Infrared Microphotonics, dated Mar. 20, 2013.

A. Fang et al., Optics Express vol. 14, No. 20, pp. 9203-9210, entitled Electrically Pumped Hybrid AlGaInAs-Silicon Evanescent Laser, dated Oct. 2, 2006.

\* cited by examiner

OPTICAL WAVEGUIDE, FABRICATION METHODS, AND APPLICATIONS

REFERENCE TO RELATED APPLICATION

The present application is the United States National Stage application of PCT Application Number PCT/US2016/067766, filed Dec. 20, 2016, which relates and claims priority to U.S. Provisional Application Ser. No. 62/270,221, filed Dec. 21, 2015, the entirety of each of which is hereby incorporated by reference.

STATEMENT OF GOVERNMENT INTEREST

The invention was made with funding under NSF CAREER Award # ECCS1150672. The U.S. government has certain rights in the invention.

BACKGROUND

1. Field of Invention

Embodiments relate to optical waveguides, their fabrication, and applications. More particularly, embodiments relate to high-index-contrast and mechanically stable air-clad optical waveguides and deep-trench etching and wafer bonding methods for making said waveguides, and applications thereof

2. Background of Art

There are reported technologies for achieving air-clad waveguides in order to take advantage of the wide optical transparency window that it offers. In U.S. Pat. No. 7,920,770 B2, a general method for forming an air cladding below a waveguide is presented, but it does not offer a means for densely integrating devices of this sort, and it requires multiple lithography steps. In U.S. Patent Application No. 2013/0322811 A1, another form of waveguide suspended over an air trench is presented, though it still retains a lower silicon oxide cladding, preventing it from being useful in the mid-IR spectrum due to the optical absorption of silicon dioxide. It also requires precision bonding or additional alignment fabrication steps.

Another suspended membrane optical waveguide fabrication technique was demonstrated earlier in "Mid-Infrared Suspended Membrane Waveguide and Ring Resonator on Silicon-on-Insulator," by Z. Cheng et al. and published by IEEE Photonics Journal, vol. 4, no. 5., pp. 1510-1519, October, 2012, in which the buried oxide layer was removed by selective wet etching underneath pre-fabricated silicon waveguides, resulting in a suspended membrane. This had the drawback of a large minimum width for the suspended area, and substantially reduced membrane strength due to the need to form "etch holes" on the surface of the silicon.

An improved idea was published by the inventor in "High-Contrast, All-Silicon Waveguiding Platform for Ultra-Broadband Mid-Infrared Photonics," published by Applied Physics Letters, vol. 103, no. 15, p. 151106, October, 2013, which directly bonded a silicon membrane over a pre-fabricated air trench. However, it required a precision alignment step and etching of the membrane in order to form the waveguide, resulting in some weakening and constraining the maximum amount of etching before damaging the membranes.

An alternative type of air-clad waveguide was demonstrated in "Air-Clad Silicon Pedestal Structures for Broadband Mid-Infrared Microphotonics," by P. T. Lin et al. and published by Optics Letters, vol. 38, no. 7, p. 1031, March, 2013, in which a rectangular silicon waveguide rests upon an etched silicon pedestal. However, this is not compatible with dense integration, and the strong lateral confinement of the waveguides and substantial separation between the structures implied by the fabrication method prevents evanescent coupling between adjacent modes, a key requirement for resonant structures on an integrated platform.

Therefore, there is a need for an integrated photonic platform that can operate over octave-spanning or even multi-octave spectral windows. Such systems require a suitable platform for fabrication which offers low propagation losses, tight optical confinement, and accurate control over dimensional characteristics. Normally, these requirements are at odds with each other, making it difficult to realize high-performance systems without compromising key features.

SUMMARY OF THE INVENTION

The present invention is an integrated photonics platform having an optical waveguide with at least two air chambers separated by a post. The air chambers define an upper region and a lower region of the optical waveguide connected by the post. The T-shaped optical waveguide causes confinement of the optical mode in the region where the slab portion is connected to the post. This shape prevents leakage of light into the silicon wafer.

The integrated photonics platform is created by first forming a pattern on a surface of a silicon base wafer. The pattern can be formed with a polymer and silicon dioxide mask. The silicon base wafer is then etched anisotropically with inductively-coupled plasma reactive-ion-etching. The polymer mask is then removed and the silicon base wafer is isotropically coated with an additional silicon dioxide coating. The silicon base wafer is then anistropically etched twice, first on the silicon dioxide coating, then on the silicon, creating a post beneath the silicon dioxide mask. Then, a brief isotropic silicon etch is applied to the silicon base wafer to produce a small reduction in the post width. Next, the silicon dioxide mask is stripped from the base wafer and a silicon-on-insulator donor wafer is bonded to the silicon base wafer. The backside of the silicon-on-insulator donor wafer terminating at a silicon dioxide layer of the silicon-on-insulator donor wafer is removed, producing a finalized T-shaped optical waveguide.

BRIEF DESCRIPTION OF THE DRAWINGS

The present invention will be more fully understood and appreciated by reading the following Detailed Description in conjunction with the accompanying drawings, in which.

DETAILED DESCRIPTION

Figure 1A:
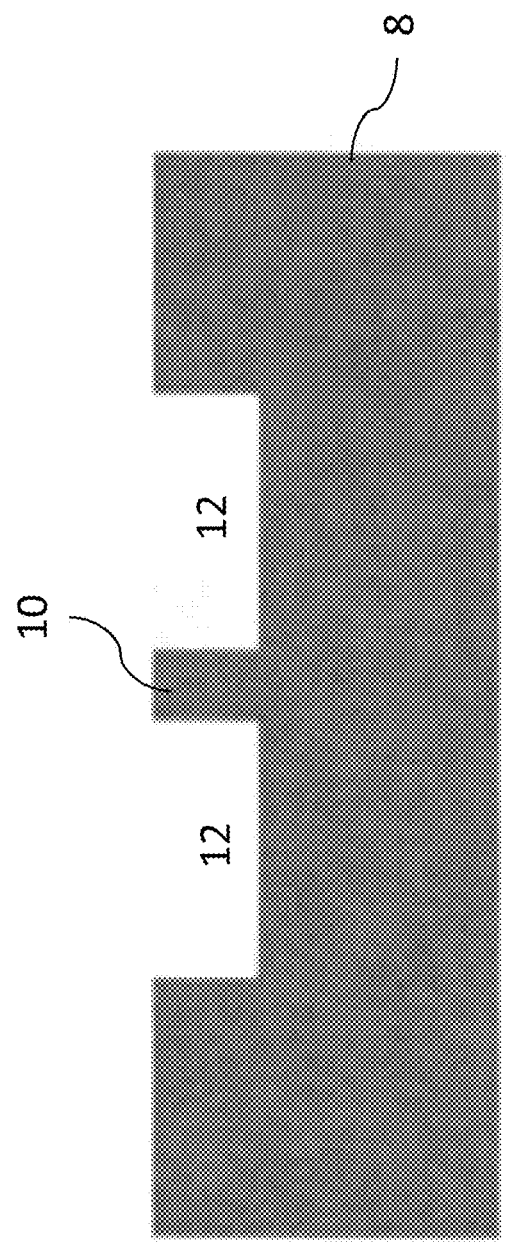
FIG. 1(a) is a schematic, cross-sectional view of the top surface of a patterned silicon wafer.
Figure 1B:
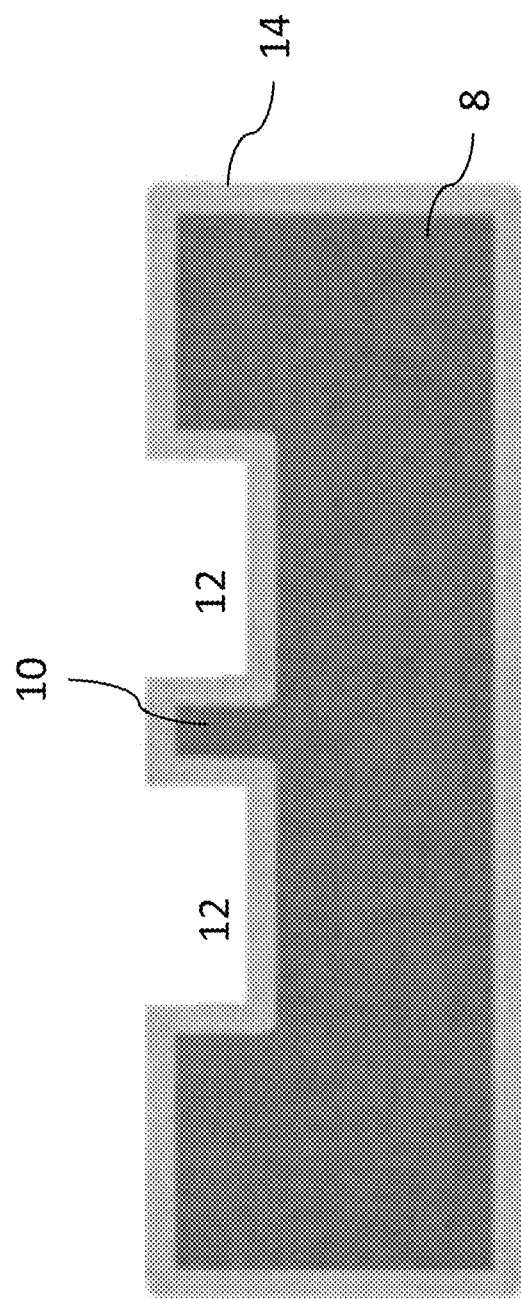
FIG. 1(b) is a schematic, cross-sectional view of the top surface of a silicon wafer after thermal oxidation.
Figure 1C:
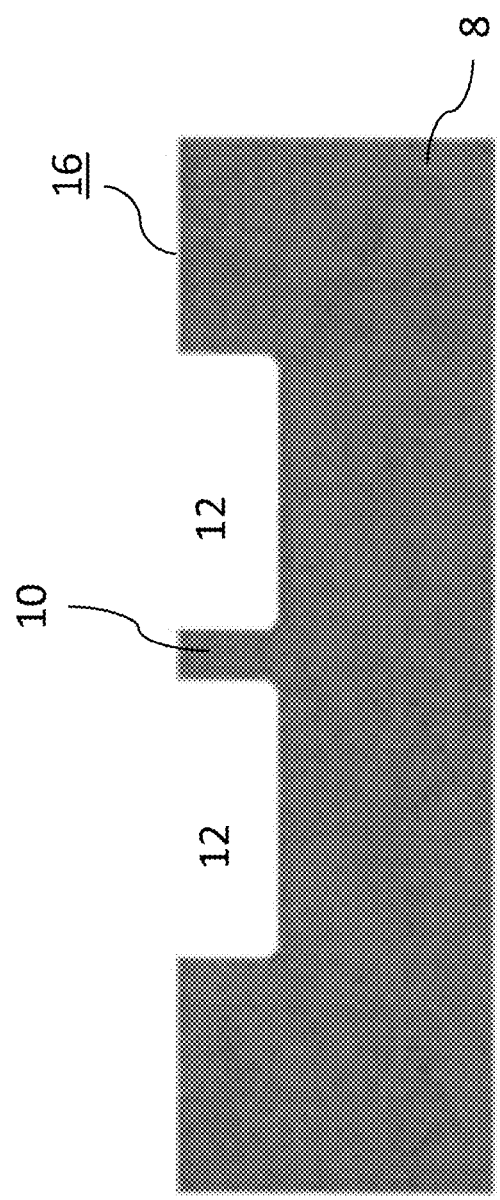
FIG. 1(c) is a schematic, cross-sectional view of the top surface of a silicon wafer after removal of a thermal oxide.

Embodiments of the invention pertain to a novel integrated photonics platform that enables operation over a wide transmission band in the infrared range of light (from wavelengths of 1.2-8.5 microns), and a method for making the integrated photonics platform. It is based on integrated photonics technology, and an example method of making will be described using silicon wafers and silicon-on-insulator wafers; however, the method is not limited to the use of silicon; other suitable materials are described below. To more effectively describe the invention, the steps for fabricating a simple optical waveguide using an embodied approach will first be explained. Referring now to the drawings, wherein like reference numerals refer to like parts throughout, there is seen in FIGS. 1(a-f) schematic, cross-sectional views of the top surface of a silicon wafer undergoing processing using this approach, resulting in an optical waveguide structure 100 used in this platform as shown in FIG. 1(g). In the cross-sectional figures, it can be assumed that the structure extends indefinitely into the page.

Figure 4:
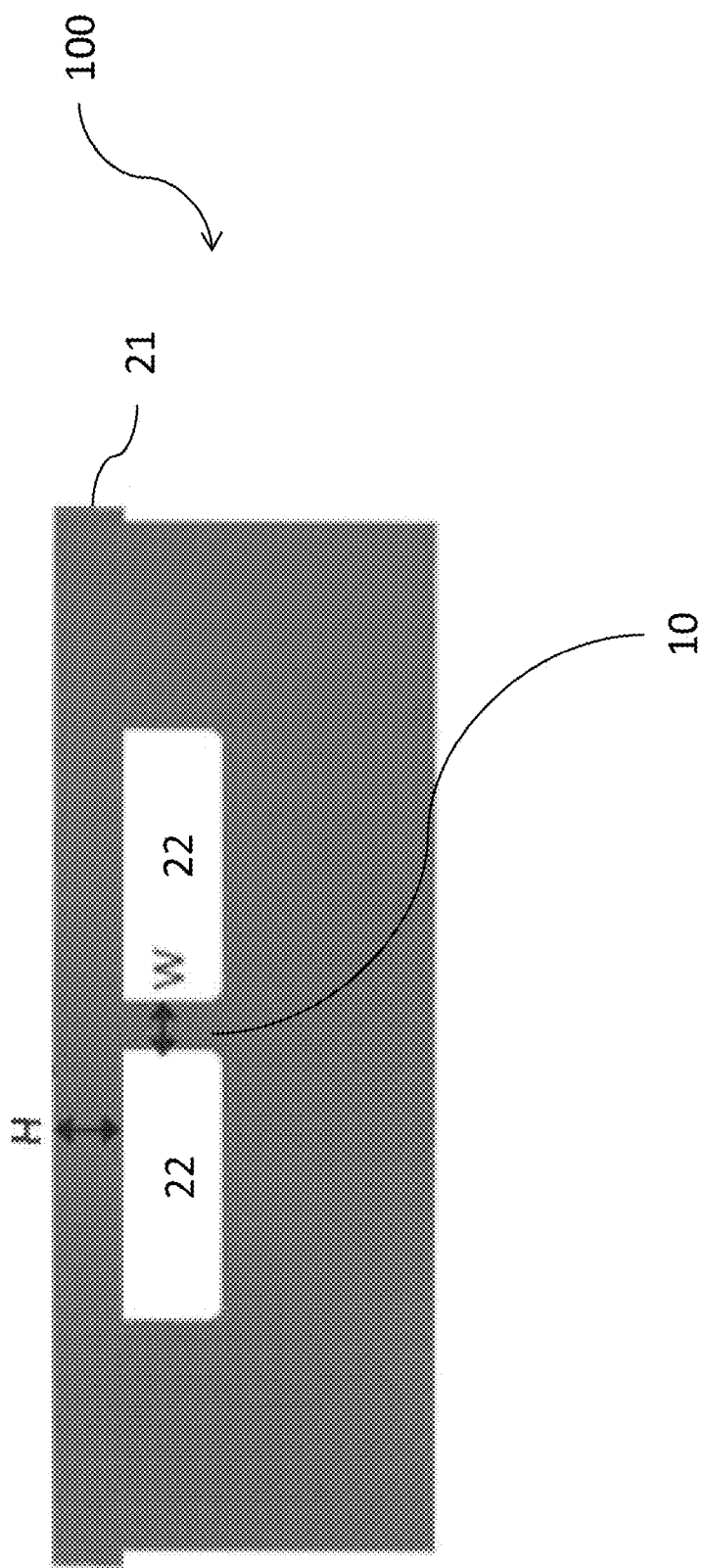
FIG. 4 is a schematic, cross-sectional view of the T-guide with dimensional features shown.

Referring to FIG. 1(a), the processing begins with a polished, flat silicon wafer 8 (referred to here as the "base" wafer) that is patterned with a polymer or silicon dioxide mask using conventional photo- or electron-beam-lithography techniques and inductively-coupled plasma reactive-ion-etching (ICP-RIE) to form a narrow post 10 that is in the range of 0.3 to 3 microns in width, w (see FIG. 4), surrounded by deep trenches 12 that are in the range of 3-20 microns in width. Then, in FIG. 1(b), the base wafer is thermally oxidized with $SiO_2$ (at 14) by a thickness in the range of 0.2 to 1 microns. An optional step (not shown) involves the use of chemical-mechanical polishing (CMP) to remove the top layer of thermally grown silicon dioxide and to remove any rounded silicon corners on the silicon surface 16. Next, all silicon dioxide is stripped from the wafer (FIG. 1(c)), which may be performed by wet etching in a solution containing hydrofluoric acid. This results in a dramatic reduction in the roughness of the features due to the diffusive behavior of oxidation, which we refer to as a 'smooth' surface in which the root mean square value of geometrical perturbations is less than 30 nm.

Figure 1D:
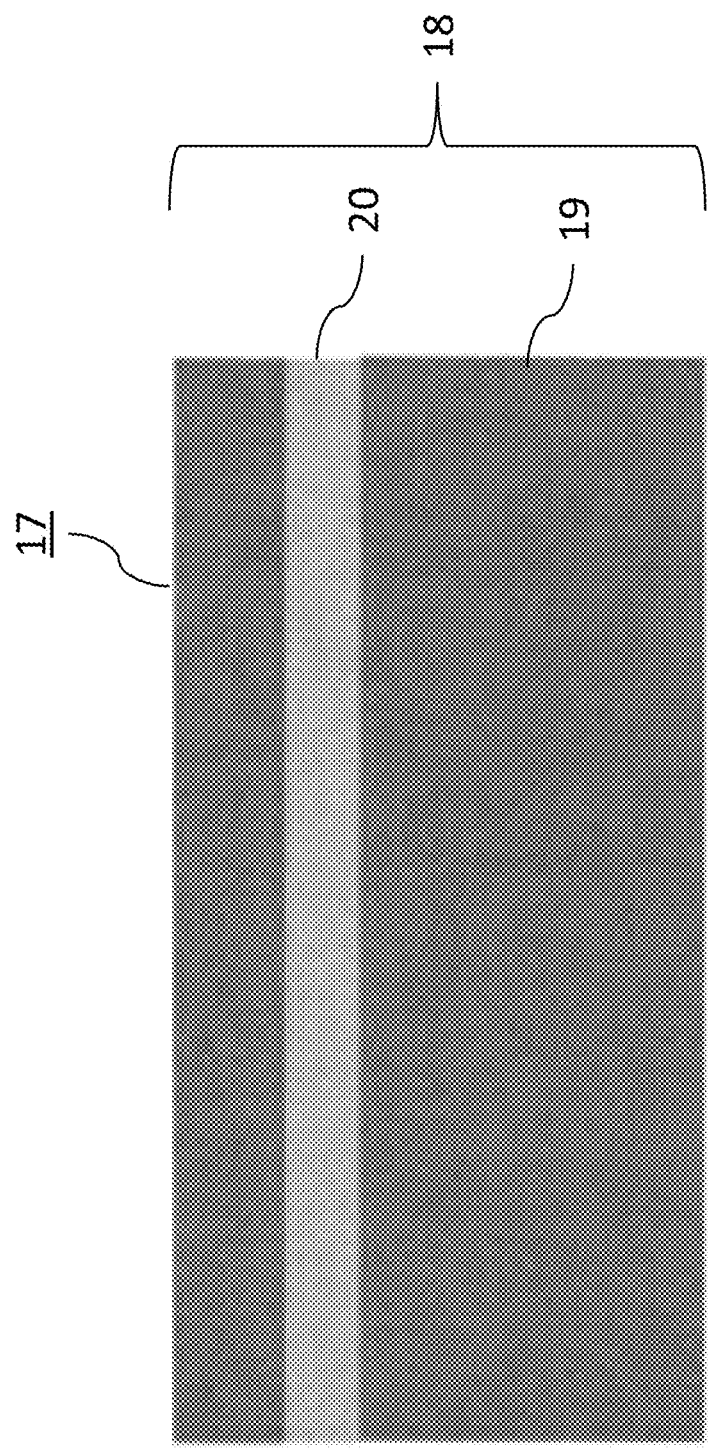
FIG. 1(d) is a schematic, cross-sectional view of the top surface of a silicon-on-insulator wafer.
Figure 1E:
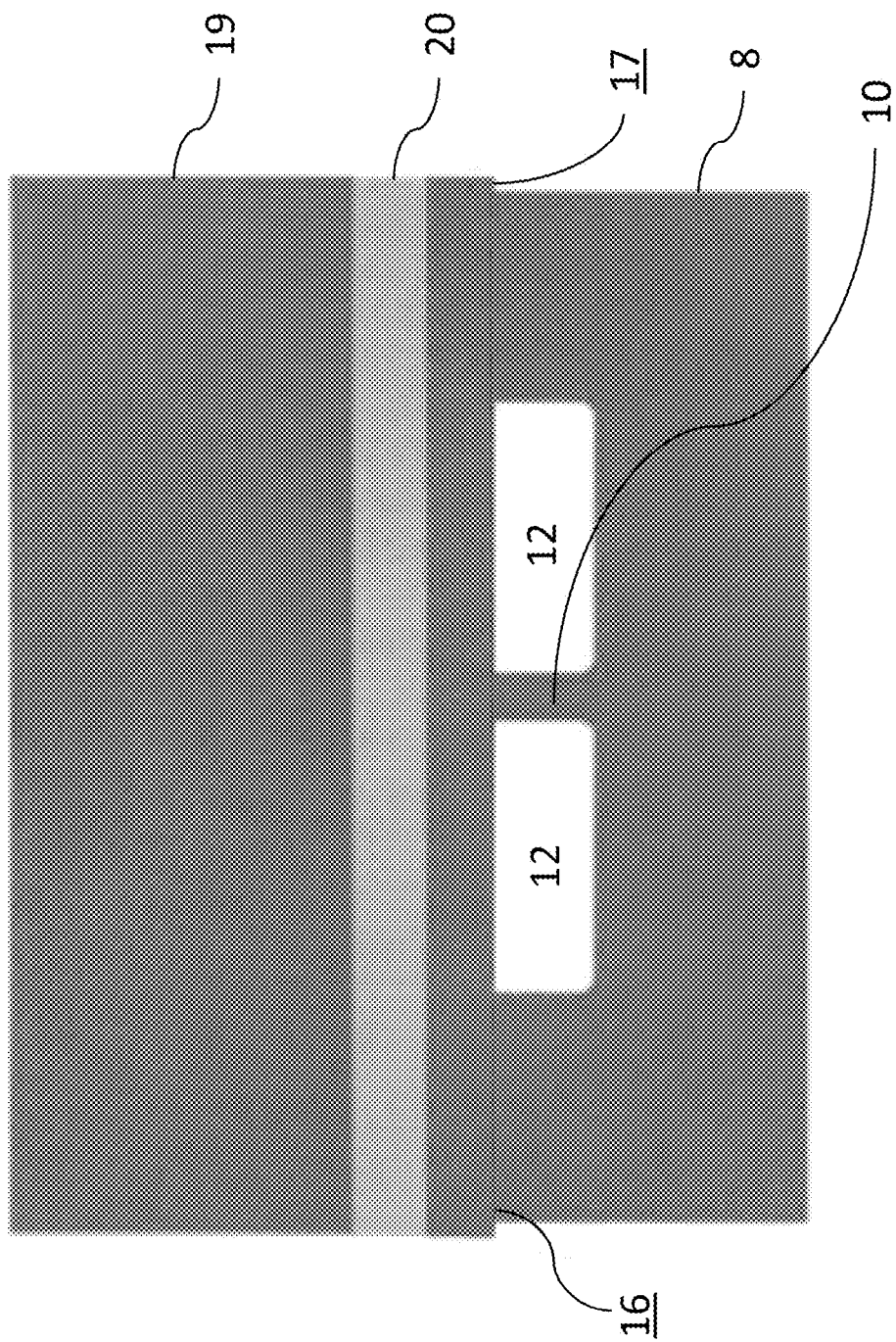
FIG. 1(e) is a schematic, cross-sectional view of the top surface of a silicon-on-insulator wafer bonded to the patterned silicon wafer.
Figure 1F:
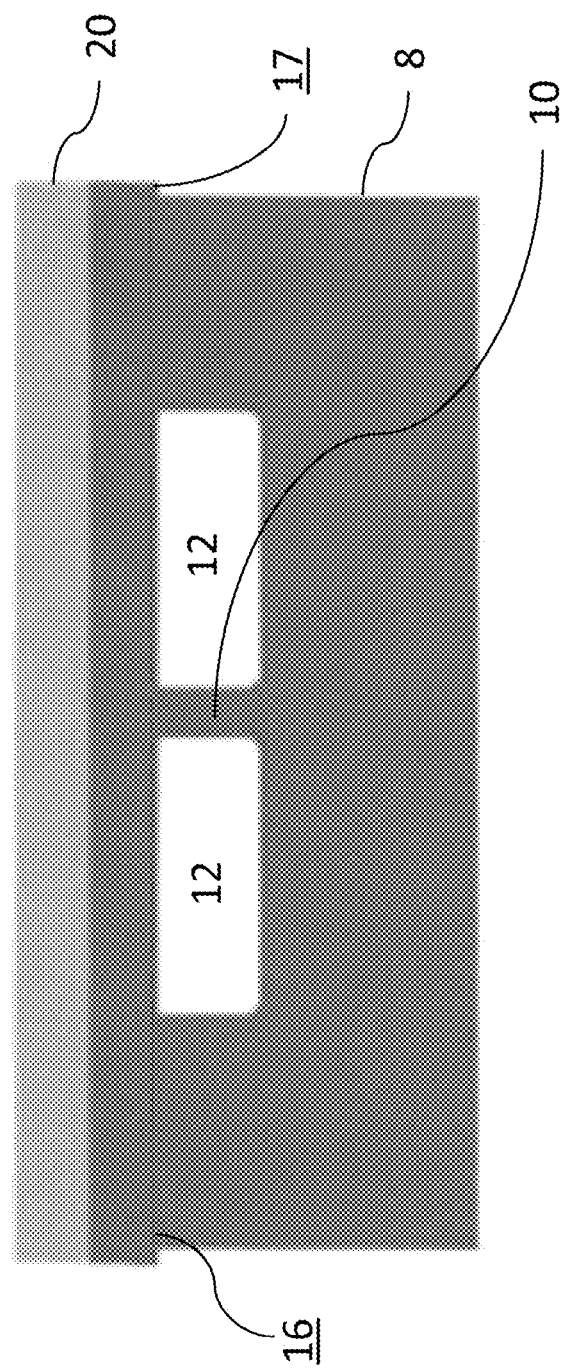
FIG. 1(f) is a schematic, cross-sectional view of the top surface of a patterned silicon wafer after backside removal from the silicon-on-insulator wafer.
Figure 1G:
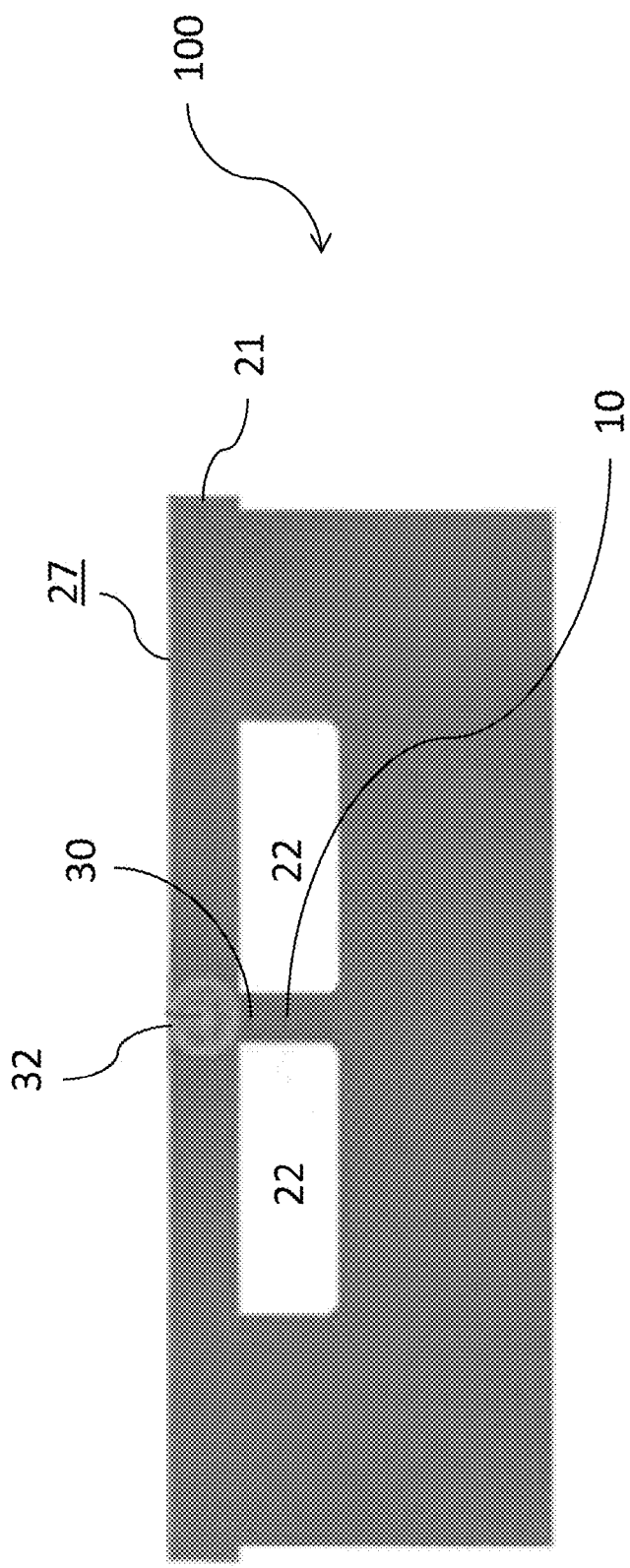
FIG. 1(g) is a schematic, cross-sectional view of the top surface of a resulting photonics platform with the optical mode confined to the colored region in the T.

Referring to FIG. 1(d), a silicon-on-insulator (SOI) "donor" wafer 18 is obtained separately. The base and the SOI donor wafers are treated with argon and/or oxygen plasma, and optionally dipped in deionized water to activate the surface and then dried. Then, at FIG. 1(e), the SOI donor wafer 18 is inverted and surface 17 is placed against the flat, smooth top surface 16 of base wafer 8, resulting in a permanent bond between the two wafers. The bond is then annealed at temperatures ranging from 90 to 1000° C. depending on the thermal budget allotted to the system. Next, at FIG. 1(f), the backside 19 of the SOI donor wafer 18 is removed using wet or plasma etching, which terminates at the buried oxide layer 20 due to chemical selectivity between silicon and silicon dioxide etching. Finally, the buried oxide layer 20 is removed, resulting in the finished waveguide structure 100 illustrated in FIG. 1(g) (feature 22 are air chambers (cladding)). The silicon layer (slab) 21 that has been transferred over the post 10 has a thickness ('slab height,' see FIG. 4) in the range of 0.6 to 2.5 times the width, w, of the post. In this range, the post can be engineered to provide an optimal waveguiding effect over the desired optical transparency window of 1.2-8.5 microns.

The resultant T-shaped structure (referred to hereinafter as a "T-guide") is the basis for producing optical waveguides on this platform. At the "crossing" or "junction" section 30 of the T the effective index encountered by light is greater than that of the surrounding region 22, causing confinement of the optical mode 32 in FIG. 1(g) to the crossing section 30, and preventing leakage of the light into the silicon wafer. The use of this T-shaped structure to provide the waveguide core index contrast is a novel aspect of this invention, and it has the benefit of simultaneously defining the waveguide and also providing a firm structural support for the relatively thin top layer. An important characteristic is that light only encounters crystalline silicon material in such a T-guide, allowing it to utilize the full transparency window of the material (e.g., silicon, which extends from wavelengths of 1.2-8.5 microns).

Figure 5:
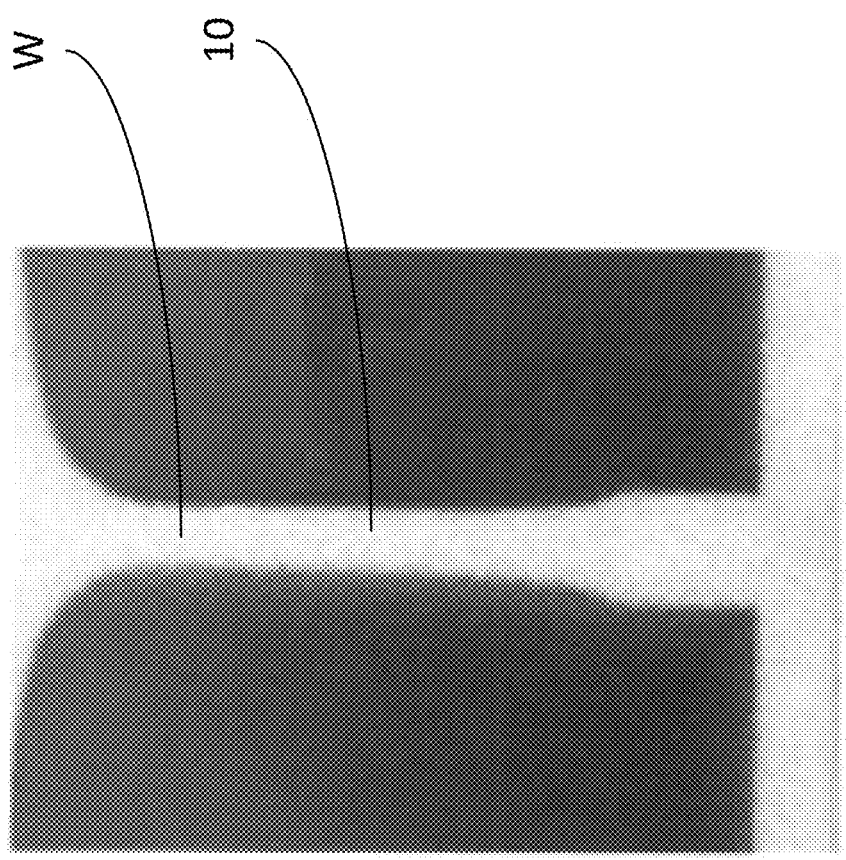
FIG. 5 is a SEM of a fabricated T-guide cross-section, featuring a reduction in post width away from the waveguiding region at the bottom.

An aspect of this invention pertains to the T-shaped optical waveguide formed by the junction of the post 10 and the slab 21; however, variations in or to the shape of the post can produce different optical properties of interest. A regular rectangular post shape sufficiently confines the optical mode 33 when the post width, w, is less than 1.4 times the slab height. If the post width is greater than this, light may leak into the substrate through the post. Different geometries may be employed for the post on the silicon wafer in another embodiment of the invention. For example, a wider post can be achieved and maintain proper waveguiding if a step-like reduction in post-width is applied partway down the post as seen in FIG. 5. The width reduction, w, of the post can occur in a range of 0.3 to 2 microns away from the junction, and can adjust the post width to be 0.9 to 0.6 times its nominal value, w. In this way, light leakage to the substrate is mitigated. The manner in which this geometry is achieved is illustrated in FIGS. 6(a-h).

Figure 6A:
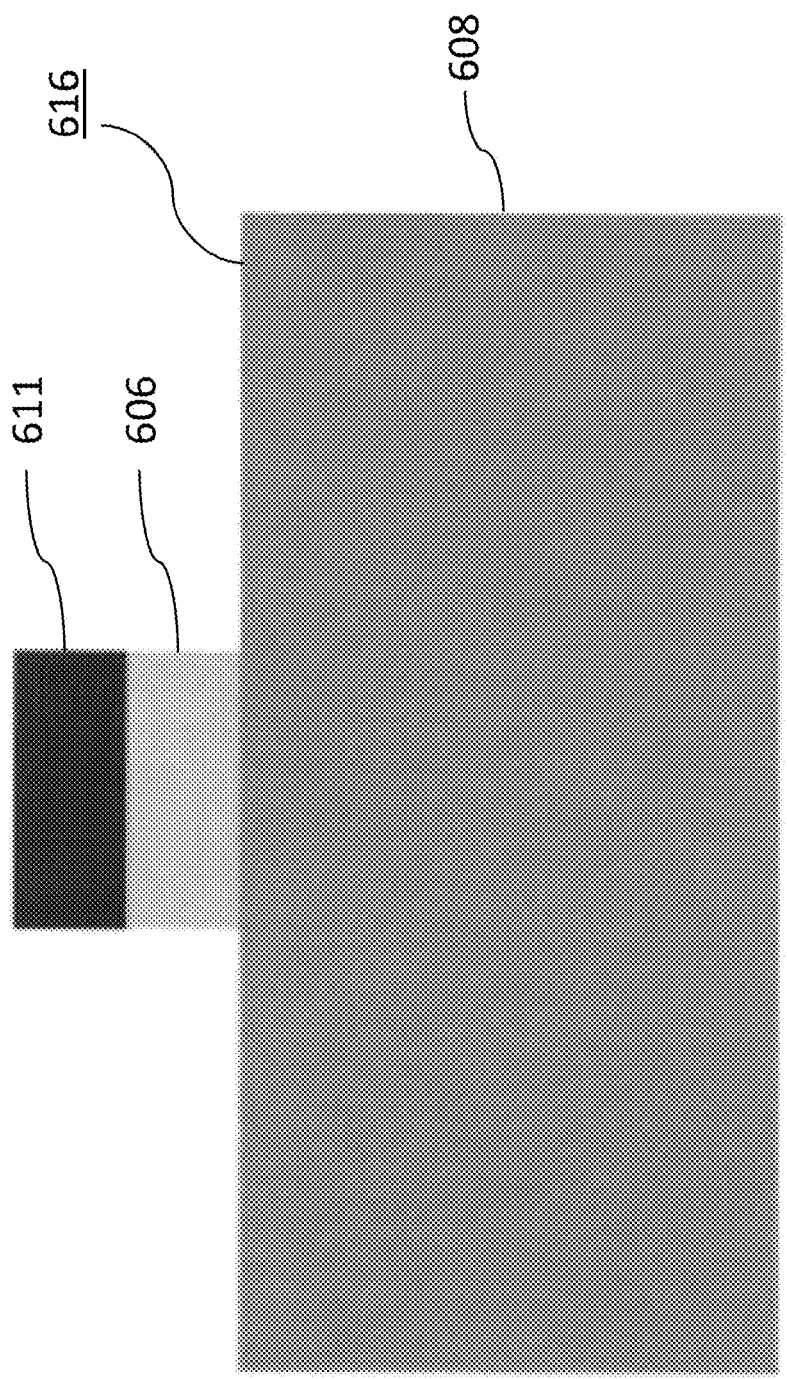
FIG. 6(a) is a schematic, cross-sectional view of the top surface of an optical waveguide with silicon dioxide and polymer mask for etching silicon.
Figure 6B:
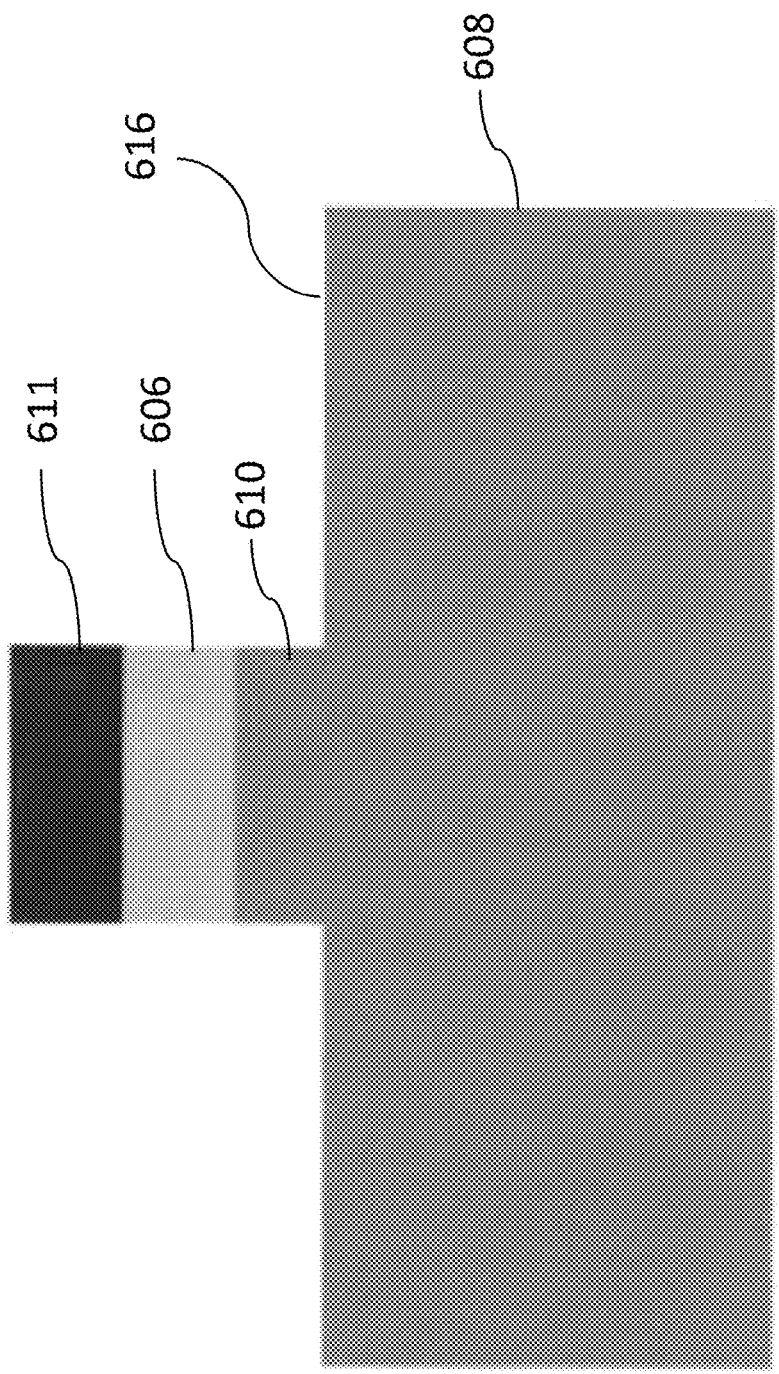
FIG. 6(b) is a schematic, cross-sectional view of the top surface of an optical waveguide with an initial anisotropic silicon etch.
Figure 6C:
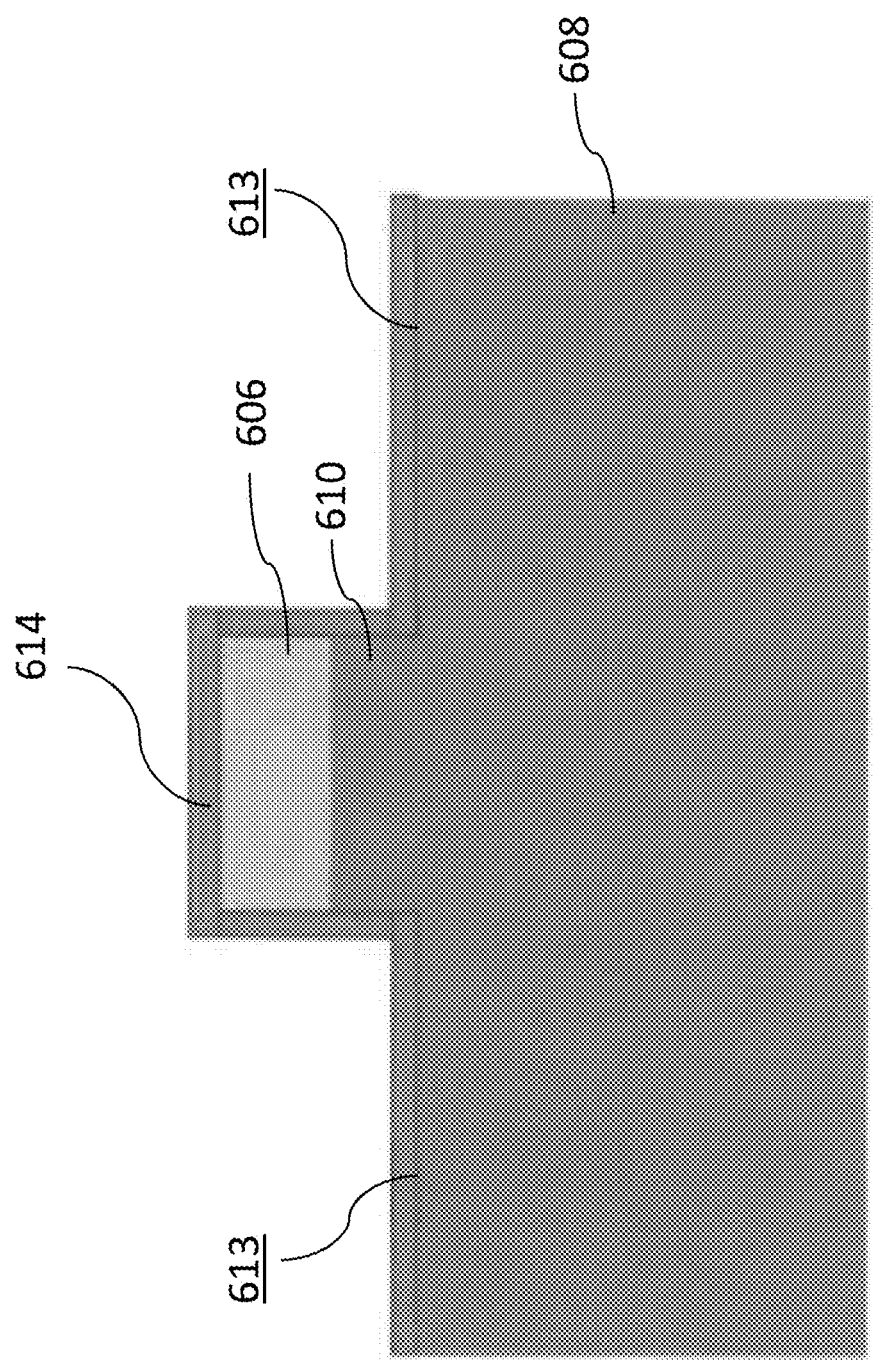
FIG. 6(c) is a schematic, cross-sectional view of the top surface of an optical waveguide after polymer mask removal and isotropic coating of additional SiO2 coating.
Figure 6D:
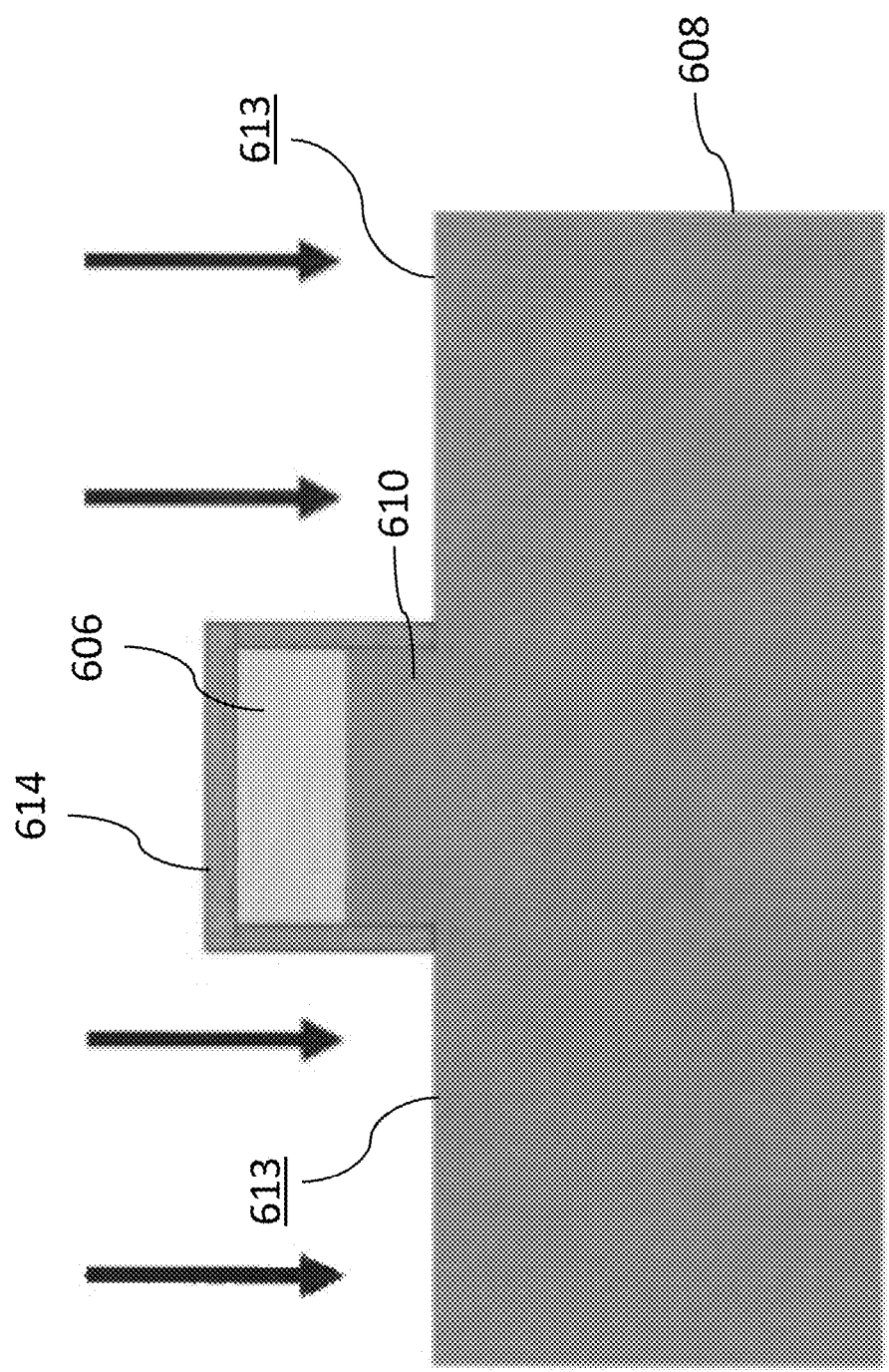
FIG. 6(d) is a schematic, cross-sectional view of the top surface of an optical waveguide with anistropic etching of silicon dioxide coating.

First, referring to FIG. 6(a), a silicon dioxide pattern 610, in the same manner as the original process, is produced on the surface 616 of the base wafer 608 using conventional electron-beam or photo-lithography and etching procedures. Next, in FIG. 6(b), the silicon wafer is anisotropically (directionally; specifically vertically) etched with ICP-RIE for a depth of 0.3 to 2 microns. A polymer mask 611, if employed in the fabrication of the initial pattern, is removed using oxygen plasma. Next, the wafer is coated with silicon dioxide using plasma-enhanced chemical vapor deposition (PECVD) for a thickness of 100 nm; such a coating has conformal properties, meaning the sidewalls of the etched feature also become coated with silicon dioxide (FIG. 6(c)). Afterward, an anisotropic dry etch using ICP-RIE is employed to remove horizontal silicon dioxide surfaces, in this case, the "floor" 613 of the trenches (FIGS. 6(c, d)). The initially masked area remains since the etch time is not sufficient to remove the silicon dioxide mask in that area.

Figure 6E:
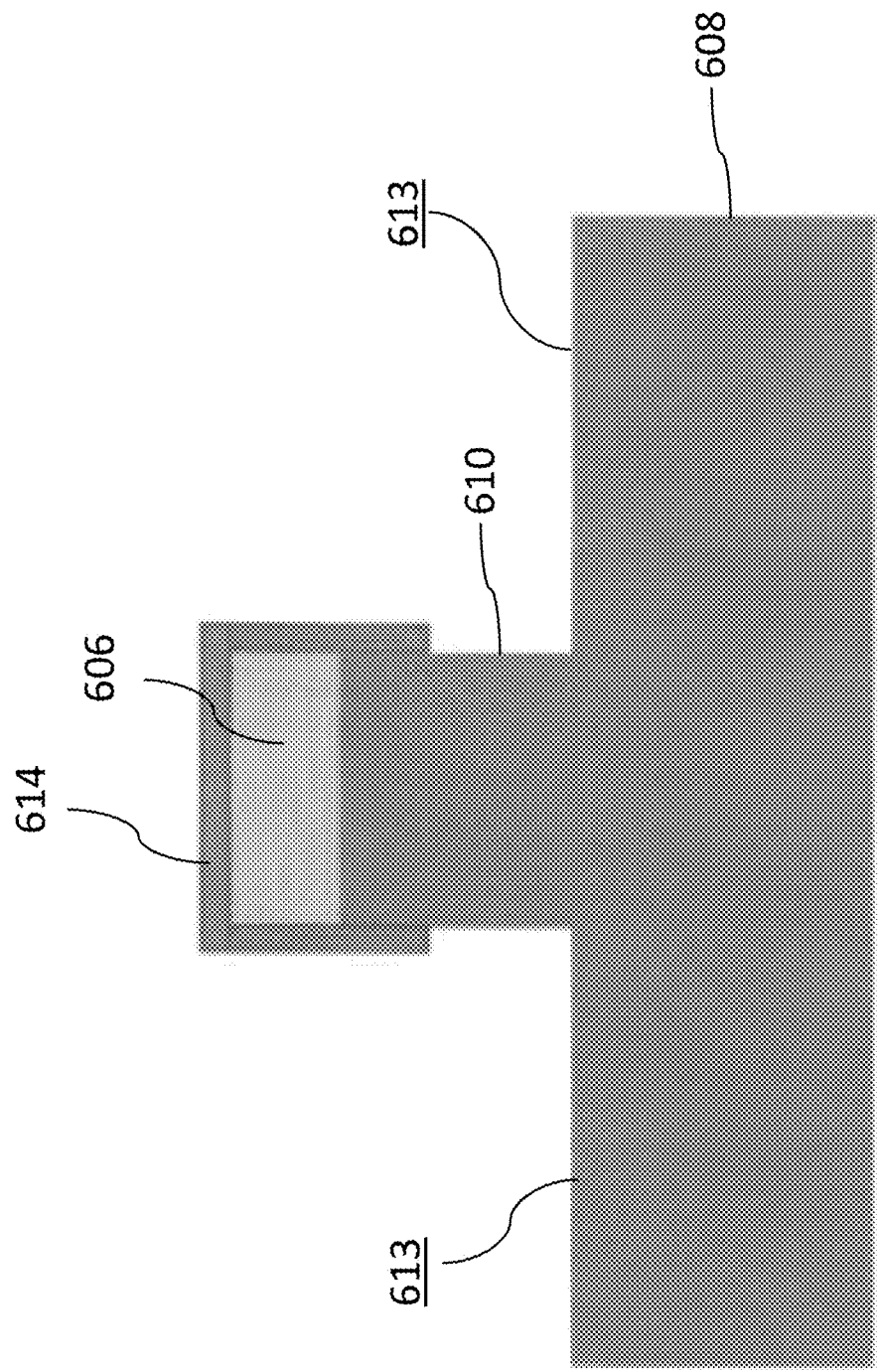
FIG. 6(e) is a schematic, cross-sectional view of the top surface of an optical waveguide with a second anisotropic etching of silicon.

Next, referring to FIG. 6(e), the exposed trench floors are etched again with ICP-RIE for a distance of 0.5-10 microns, as needed to sufficiently distance the substrate from the area where the optical mode will be confined. After this etching, the wafer is subjected to oxygen plasma to remove any residual polymers that may have formed on the surface during the anisotropic etching process. At this point, the silicon surface may contain a thin silicon dioxide layer formed during the oxygen plasma step. It must be removed prior to the next step, but the means of removing it may be via wet chemical etching using a solution containing hydrofluoric acid (HF), or via plasma etching with a fluorine-containing gas. The amount of oxide removed must be small in order to preserve the coating on the sidewalls, so an advantageous value to remove is in the range of 5-15 nm. Then, an isotropic (non-directional) plasma etch is applied to remove silicon in the exposed areas that are not coated in silicon dioxide.

Figure 6F:
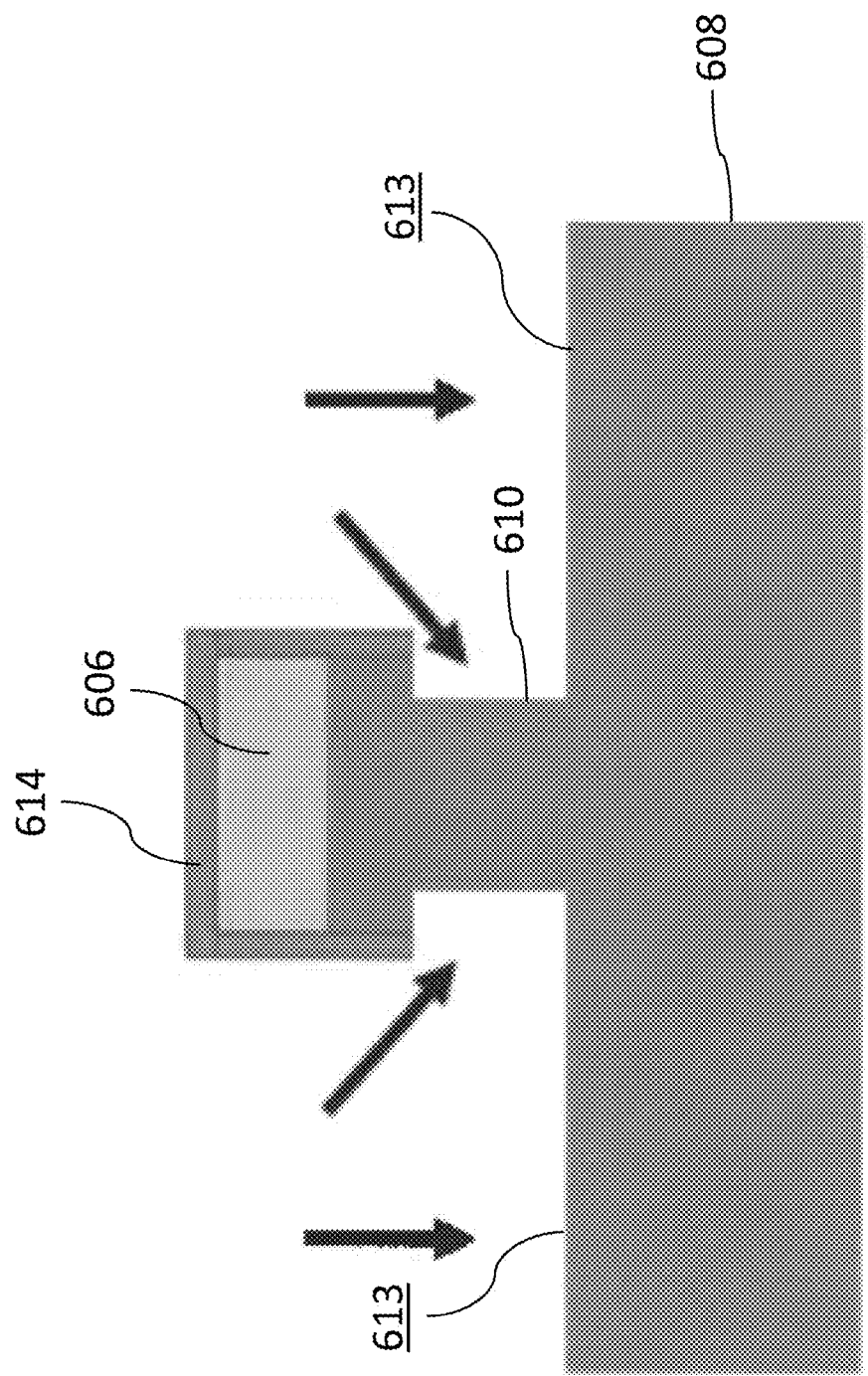
FIG. 6(f) is a schematic, cross-sectional view of the top surface of an optical waveguide with a brief isotropic silicon etch to produce a small reduction in post width.
Figure 6G:
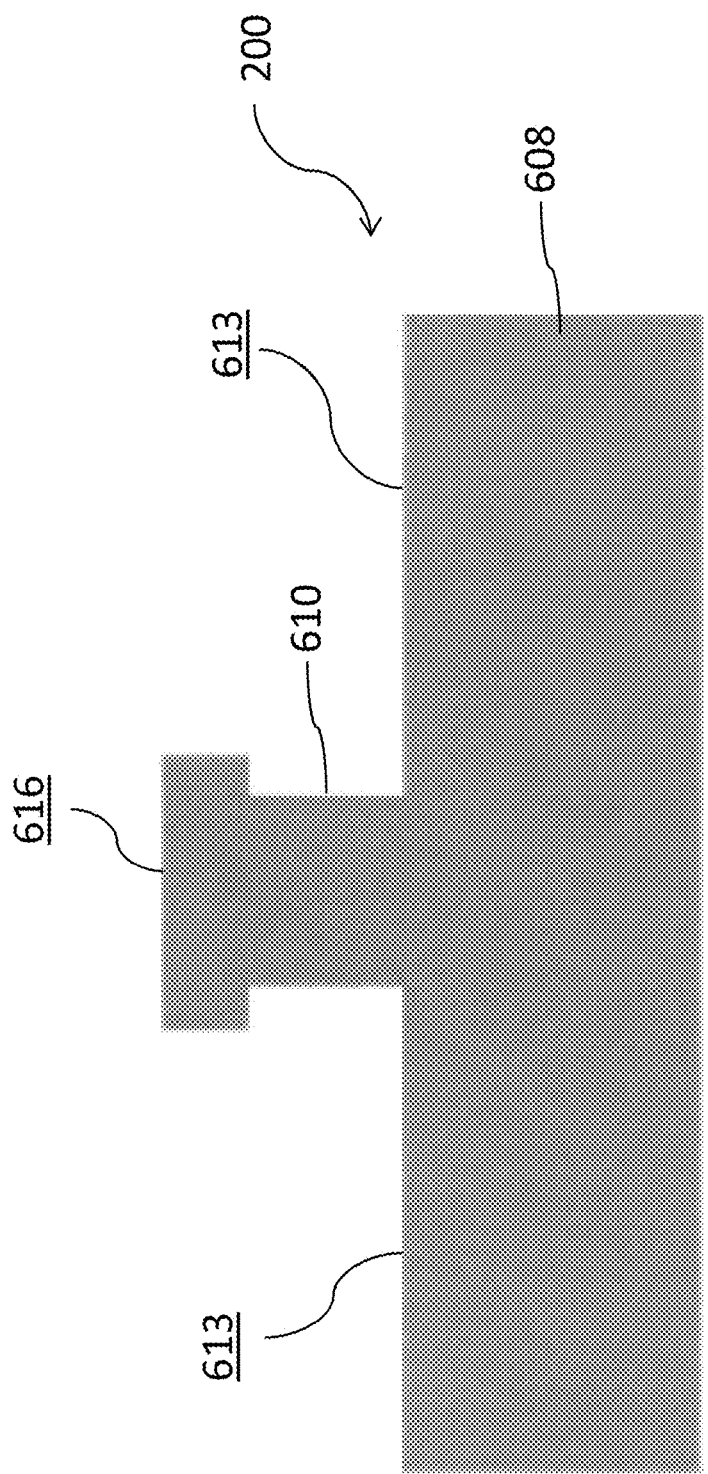
FIG. 6(g) is a schematic, cross-sectional view of the top surface of an optical waveguide having a silicon post after removal of silicon dioxide mask.
Figure 6H:
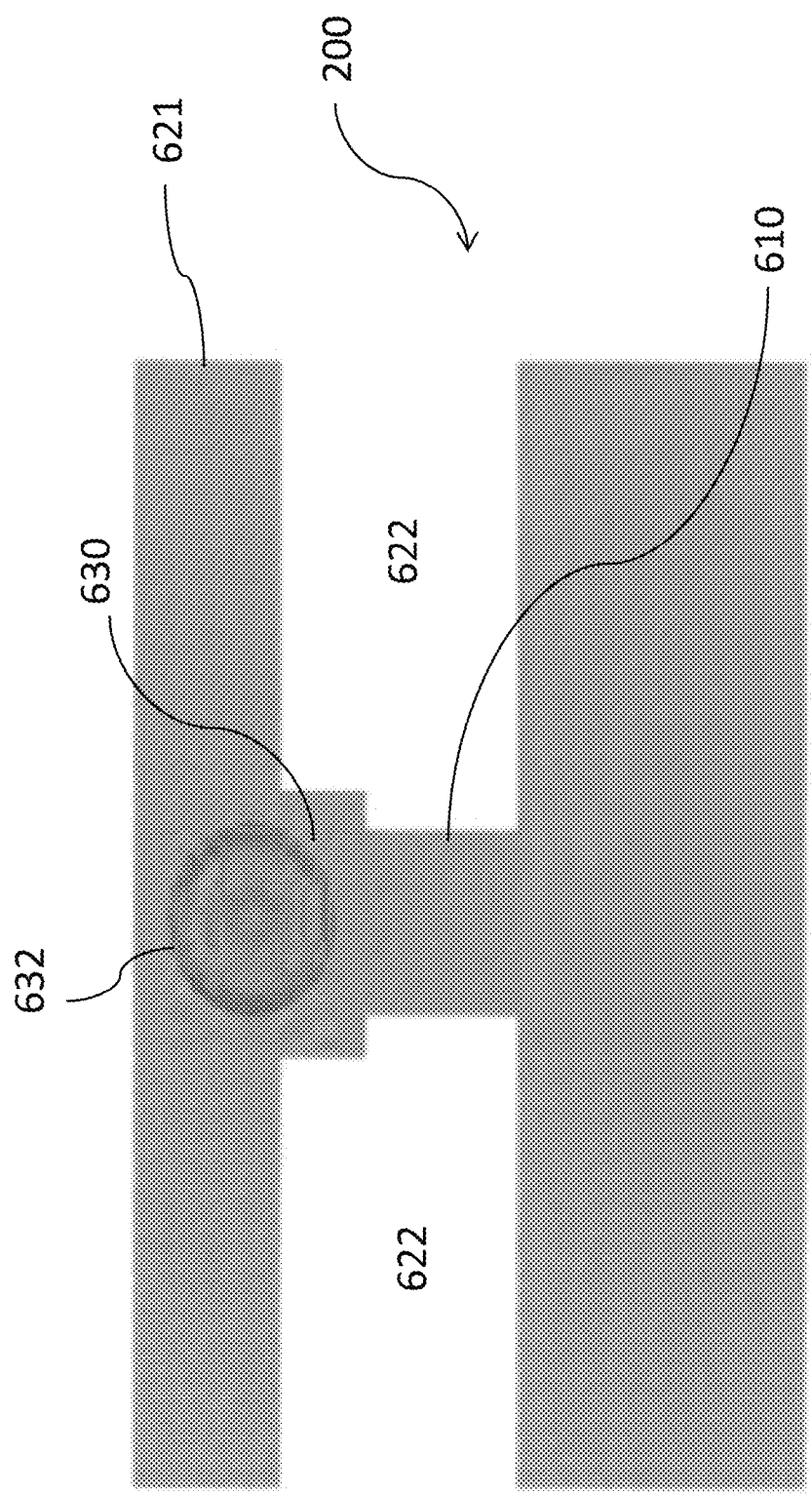
FIG. 6(h) is a schematic, cross-sectional view of the top surface of T-guide with an area representing where mode is guided.

As a result, referring now to FIG. 6(f), the post width is reduced by twice the amount of silicon that is etched on each side of the post. As mentioned before, the width of the post may be reduced to be 0.9 to 0.6 times its nominal value. Afterward, the remaining silicon dioxide is stripped from the wafer, as seen in FIG. 6(g). After these steps, normal processing of the T-guide device resumes with the bonding of the SOI donor wafer 618 on top, followed by backside removal of the donor, leaving the finalized T-guide device 200, as shown in FIG. 6(h).

Another aspect of this invention is the combined use of thermal oxidation and CMP of the silicon post structure to reduce the sidewall roughness. Normally, thermal oxidation of silicon optical waveguides results in excessive rounding of the geometry. However, in this invention, the use of CMP enables a completely vertical and flat-topped rectangular post to be achieved, such that the final waveguide structure retains high refractive index contrast, and lacks irregular curved features which would complicate modeling and design of waveguides.

Figure 7:
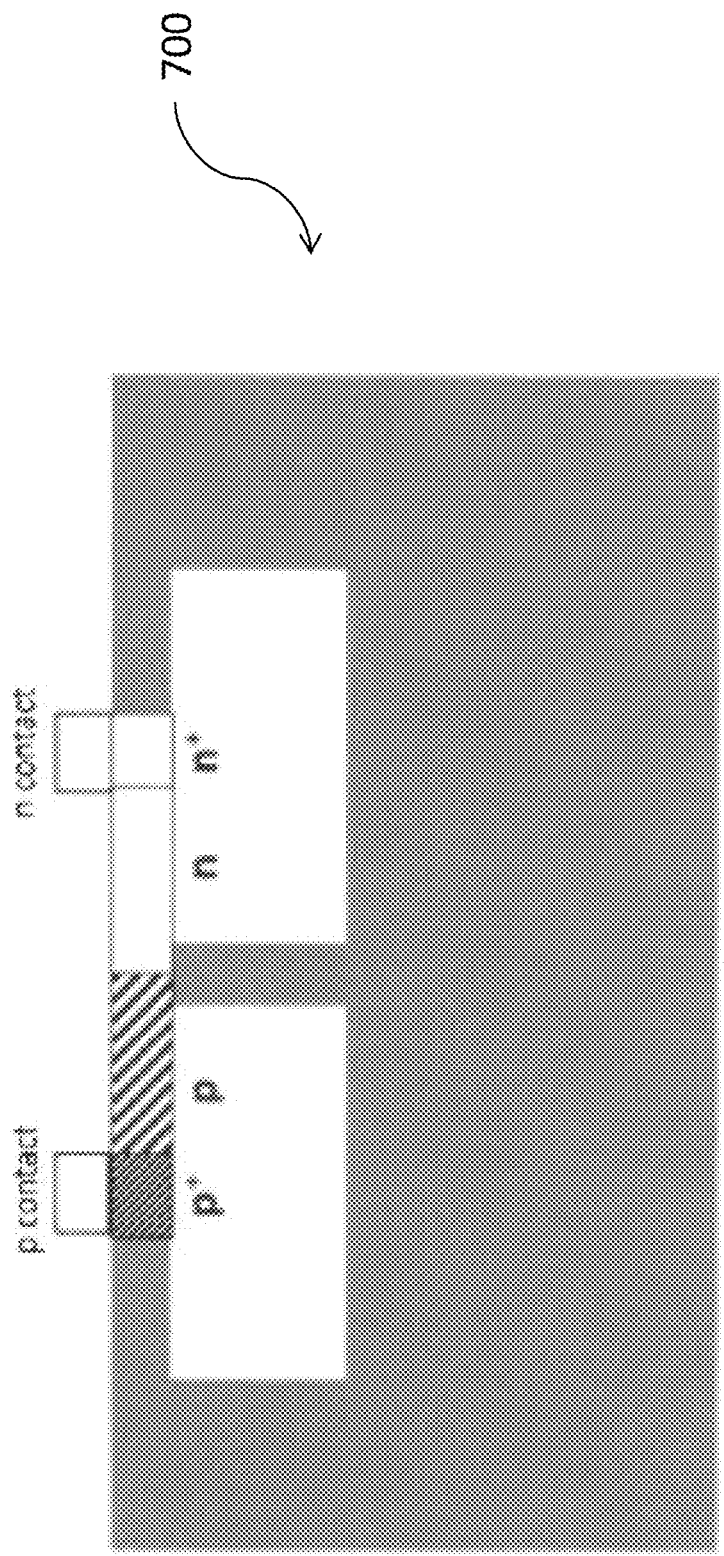
FIG. 7 is a schematic, cross-sectional view of the top surface of a P-N diode structure suggested for depletion-mode modulators with T-Guide technology.

In order to achieve active on-chip features such as modulation or phase-shifting, it is desirable to apply doping profiles to the silicon. This can enable the creation of structures such as P-N diodes. Such doping can be applied to T-guide devices to achieve profiles similar to what is indicated in FIG. 7, which would enable depletion-mode optical modulation.

Figure 8A:
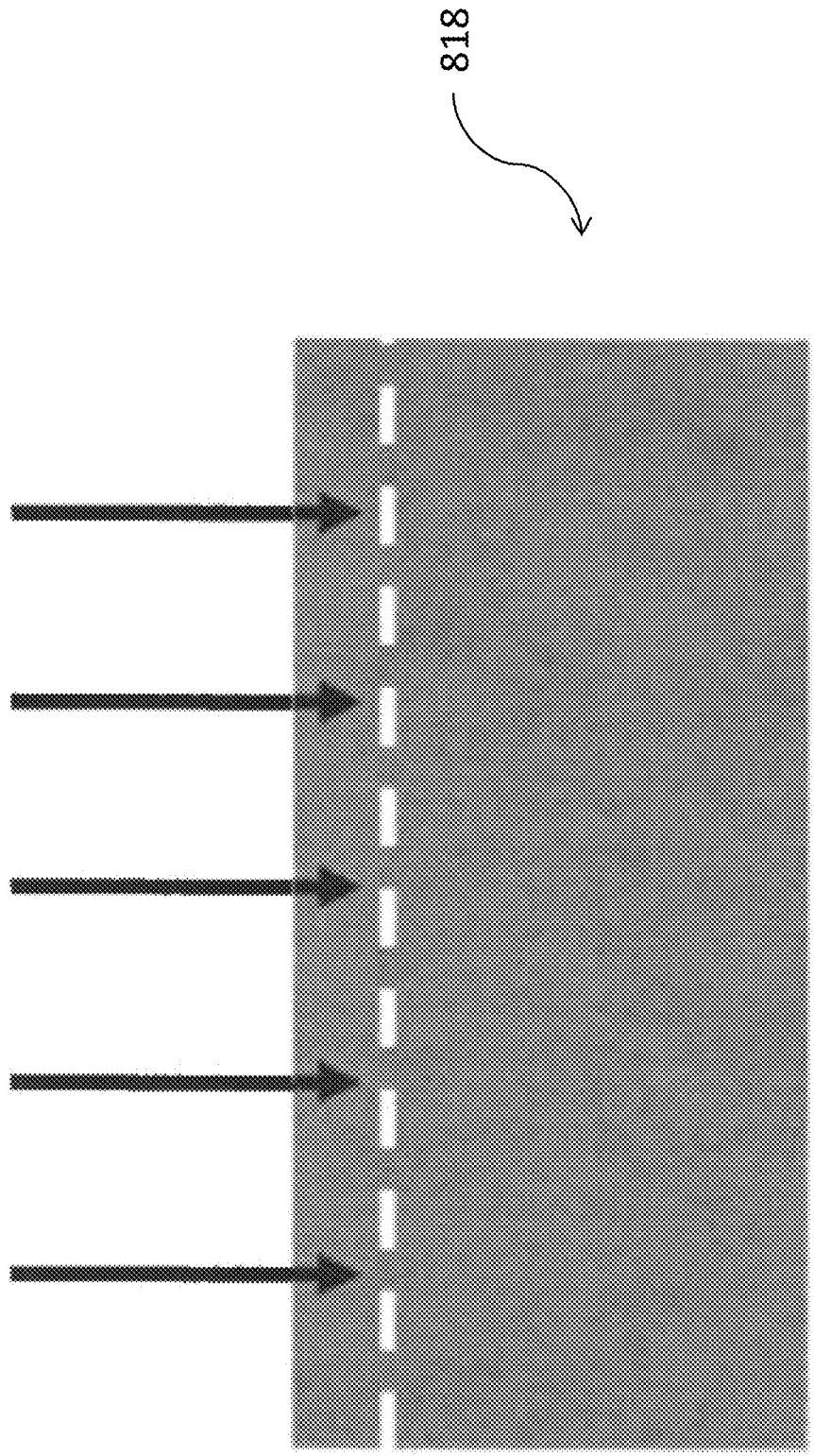
FIG. 8(a) is a schematic, cross-sectional view of the top surface of a donor wafer during ion implementation.
Figure 8B:
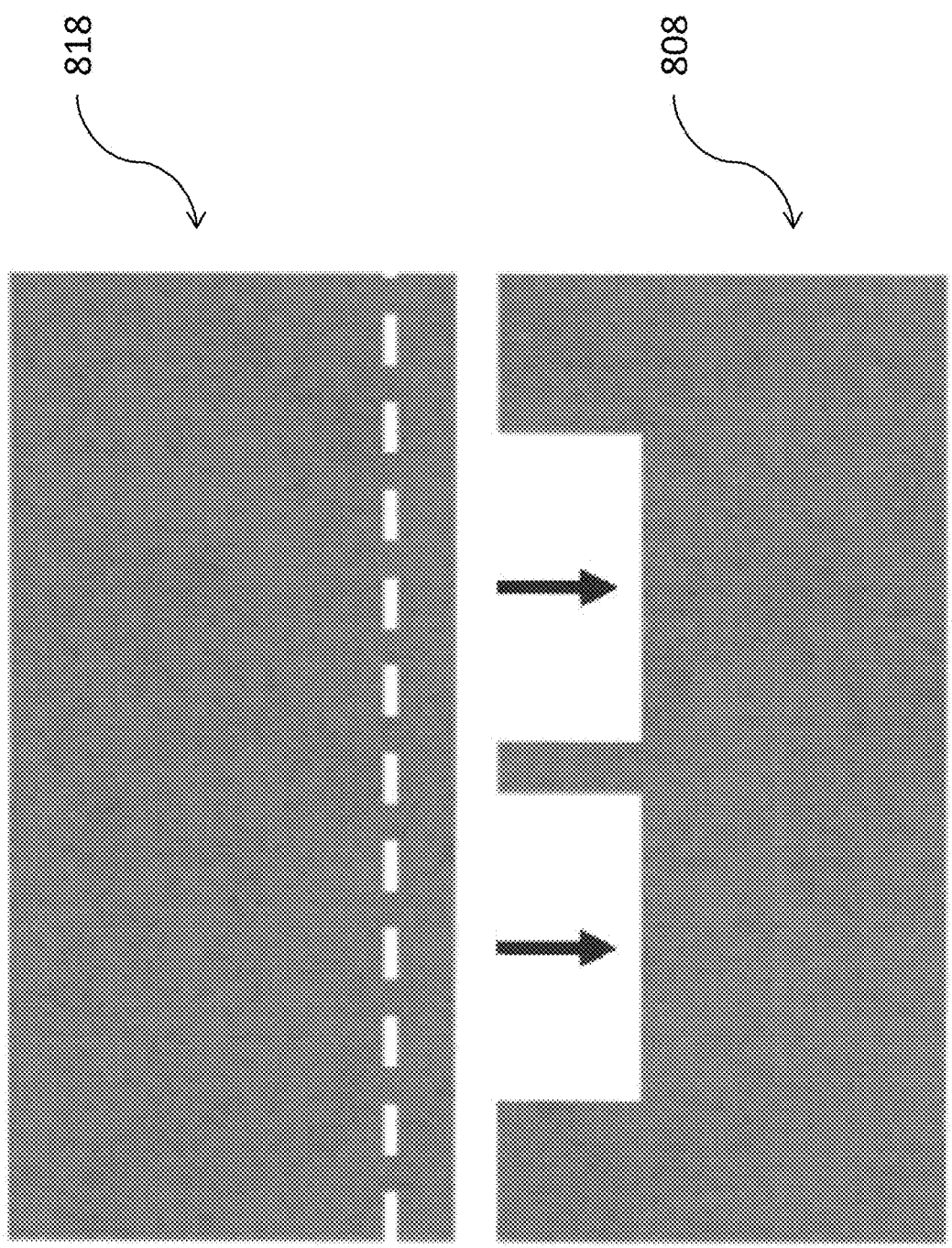
FIG. 8(b) is a schematic, cross-sectional view of the top surface of a donor wafer bonded to the base wafer.
Figure 8C:
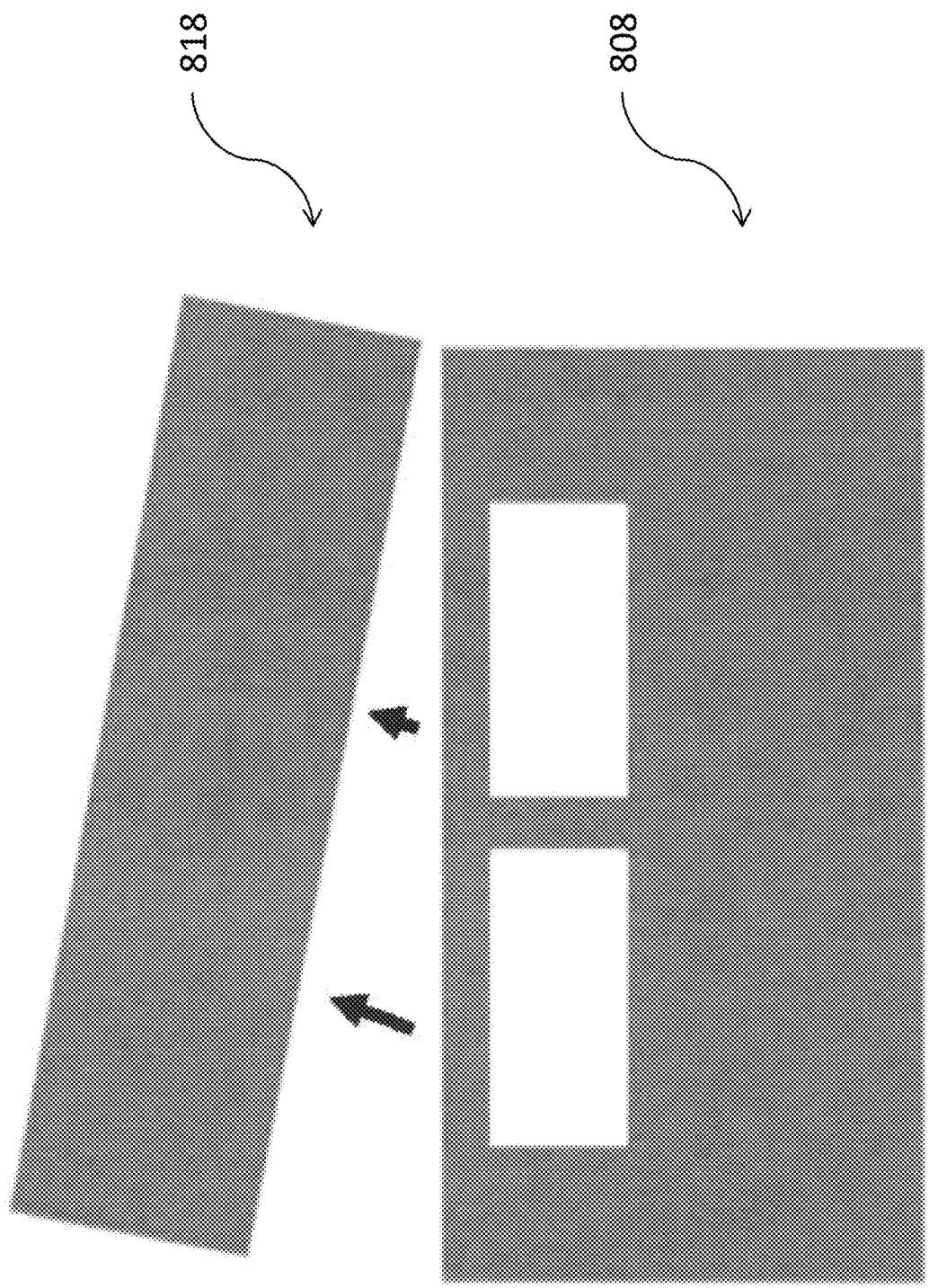
FIG. 8(c) is a schematic, cross-sectional view of the top surface of a donor wafer splitting upon heating, leaving only the thin layer of material transferred to the base wafer.

Other techniques for transferring a thin layer of material on top of the post may also be employed in the realization of this invention. One such way has been detailed in U.S. Pat. No. 5,374,564 A to M. Bruel, entitled "Process for the Production of Thin Semiconductor Material Films," which is incorporated herein by reference as though fully set forth in its entirety. The relevant process steps are detailed in FIGS. 8(a-c). By implanting ions at a specific depth in a wafer (FIG. 8(a)), bonding the wafer to the base substrate (FIG. 8(b)), and then heating it, the implanted wafer will 'crack' across the ion-loaded region leaving a thin layer of material cleanly separated from the host wafer and transferred to the new one (FIG. 8(c)). The transferred thin film can be smoothed via CMP to achieve the exact thickness and surface finish required. This is referred to in the industry as the 'Smart-Cut' technique, and it may be applied to this process in substituting for the conventional process of backside removal of the SOI wafer. Additionally, a follow-up oxidation step can be applied in order to adjust the thickness to the amount desired in case the CMP process does not permit processing of too thin of layers.

Figure 9:
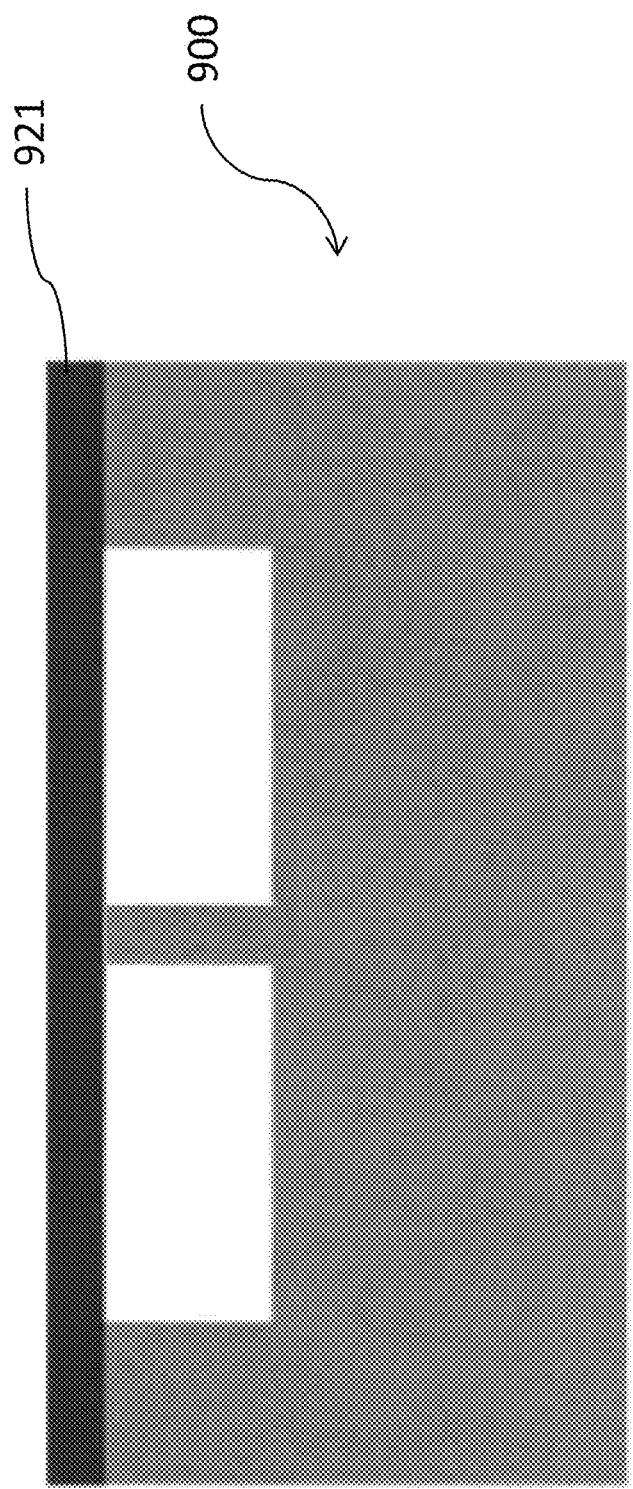
FIG. 9 is a schematic, cross-sectional view of the top surface of a hybrid T-guide structure comprised of a thin layer of crystalline GaAs transferred onto a silicon base wafer.

As mentioned above, the embodied invention is not limited to the use of silicon. The method of forming the T-guide can be applied to form novel hybrid arrangements of materials. For example, instead of transferring a thin silicon layer on top of the post, one could transfer a thin layer of another material which has a refractive index value within a range of ±0.6 to that of silicon, such as Silicon Germanium (SiGe), Germanium (Ge), Gallium Arsenide (GaAs), Indium Phosphide (InP), Gallium Phosphide (GaP), Indium Arsenide (InAs), Gallium Antimonide (GaSb), or ternary alloys of such compounds including Aluminum Gallium Arsenide (AlGaAs), Indium Gallium Arsenide (InGaAs), or Indium Gallium Phosphide (InGaP). One example implementation is shown in FIG. 9, in which a thin film of GaAs has been transferred on top of the post, forming a waveguide with a hybrid of materials. The manner in which this is achieved can be similar to the process with SOI, in which a buffer layer is grown on top of a wafer, followed by a thin layer of the material to be transferred. When the wafer is bonded to the silicon handle die and the backside and buffer are etched away, the desired material is then transferred to the final substrate. Alternatively, Smart-Cut-like techniques may be applied to achieve ion-slicing of a thin film of any of these materials onto the final substrate.

Figure 10:
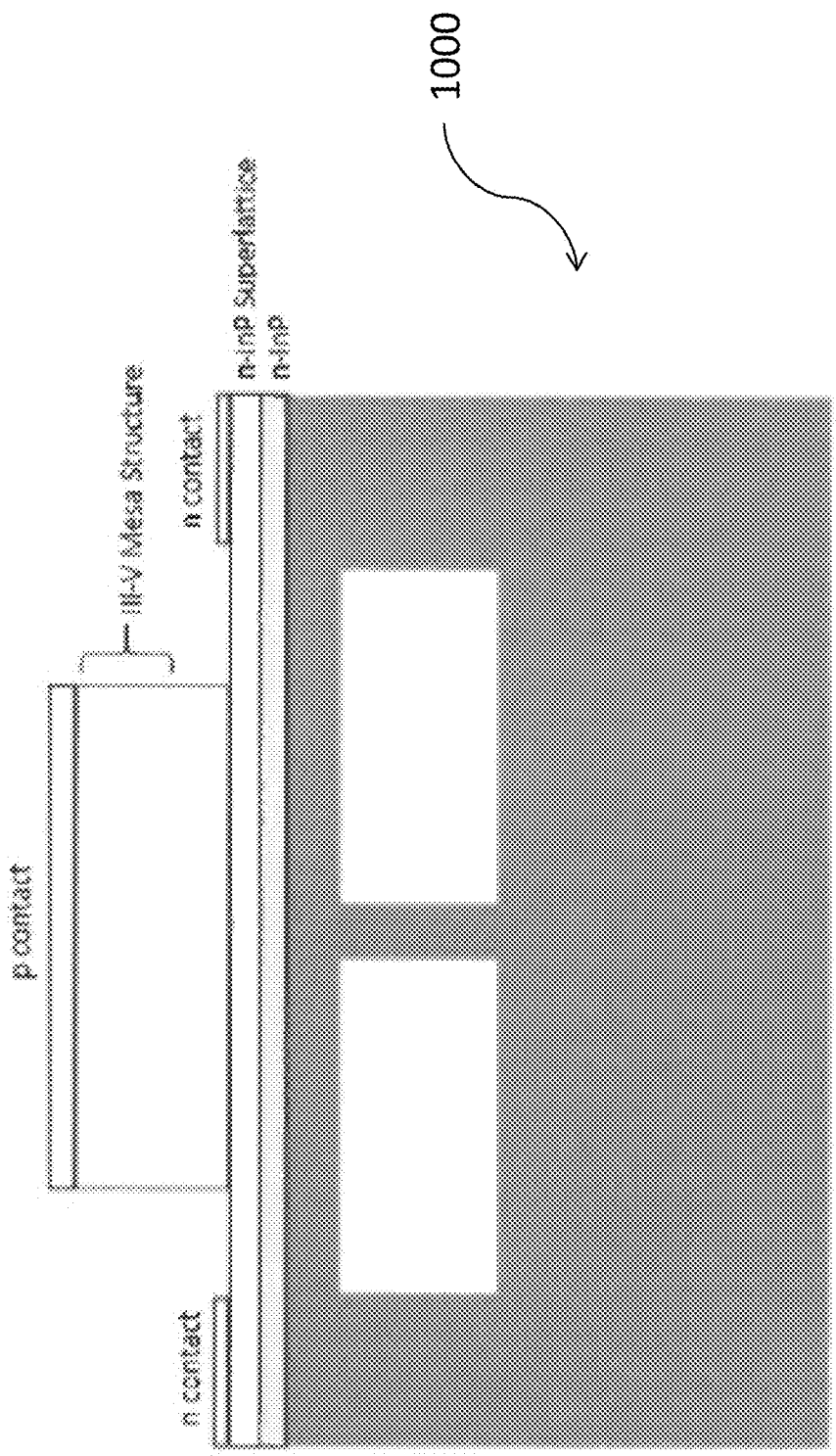
FIG. 10 is a schematic, cross-sectional view of the top surface of a hybrid III-V heterostructure mesa (based on the InP material system) bonded on top of a complete T-Guide structure, forming a hybrid integrated laser system.
Figure 11:
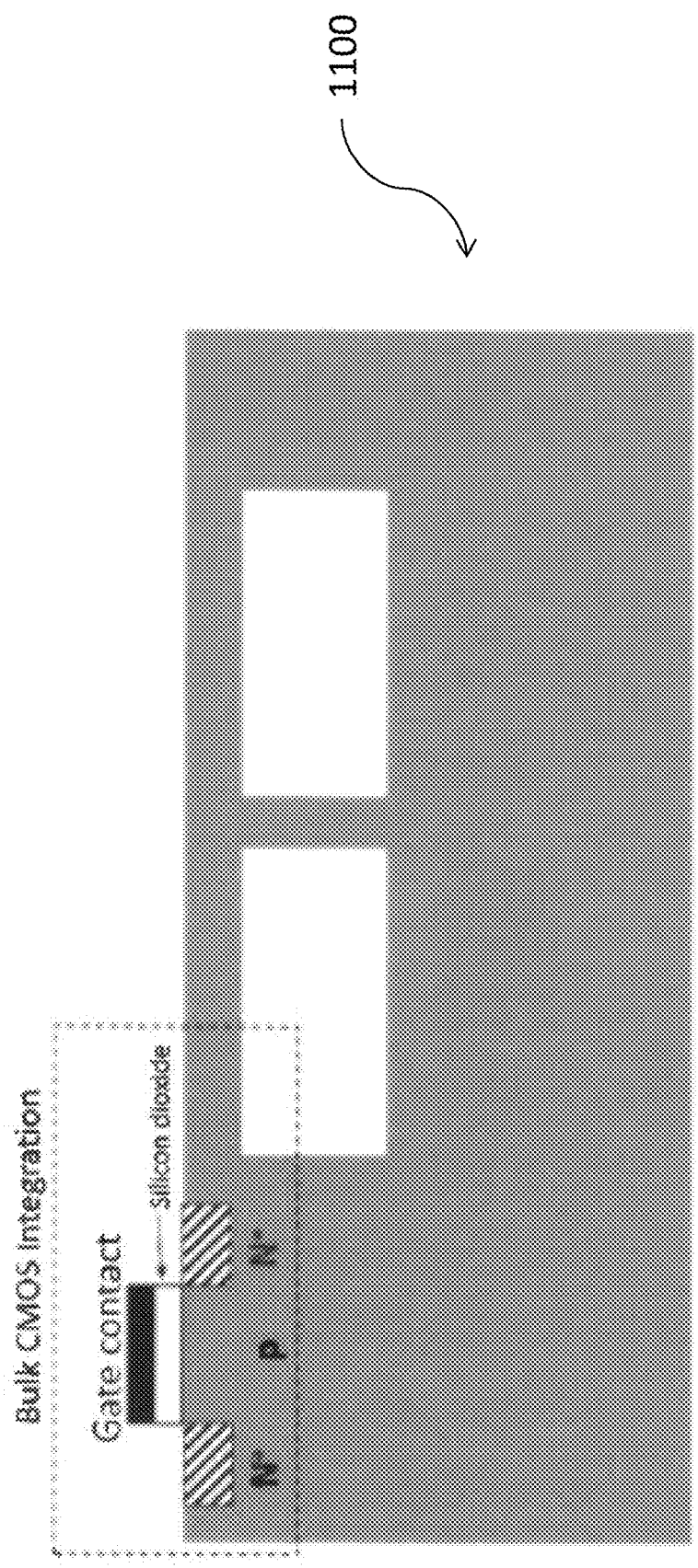
FIG. 11 is a schematic, cross-sectional view of the top surface of a T-Guide chip augmented with CMOS electronics technology.

A particular advantage of T-guide technology is the completely planar surface (e.g., 27 in FIG. 1(g)) that results after processing has finished. Thus, further addition of materials can be easily accomplished, in comparison to processes that result in irregular surface topologies. A T-guide chip could be augmented by bonding a laser heterostructure die on top, such that a hybrid waveguide would be formed by their interface, allowing integration of on-chip lasers (FIG. 10). The details of a suitable laser heterostructure for this purpose can be found in "Electrically Pumped Hybrid AlGaInAs-Silicon Evanescent Laser," by A. W. Fang et al. and published by Optics Express, vol. 14, pp. 9203-9210, October, 2006, which is incorporated herein by reference as though fully set forth in its entirety. The completely smooth, planar surface of a T-guide chip also naturally lends to straightforward integration with silicon-based electronics. Standard fabrication technologies such as the complementary metal-oxide-semiconductor (CMOS) process can be applied to T-guide wafers, enabling multifunction photonic circuits, as shown in FIG. 11.

Figure 12:
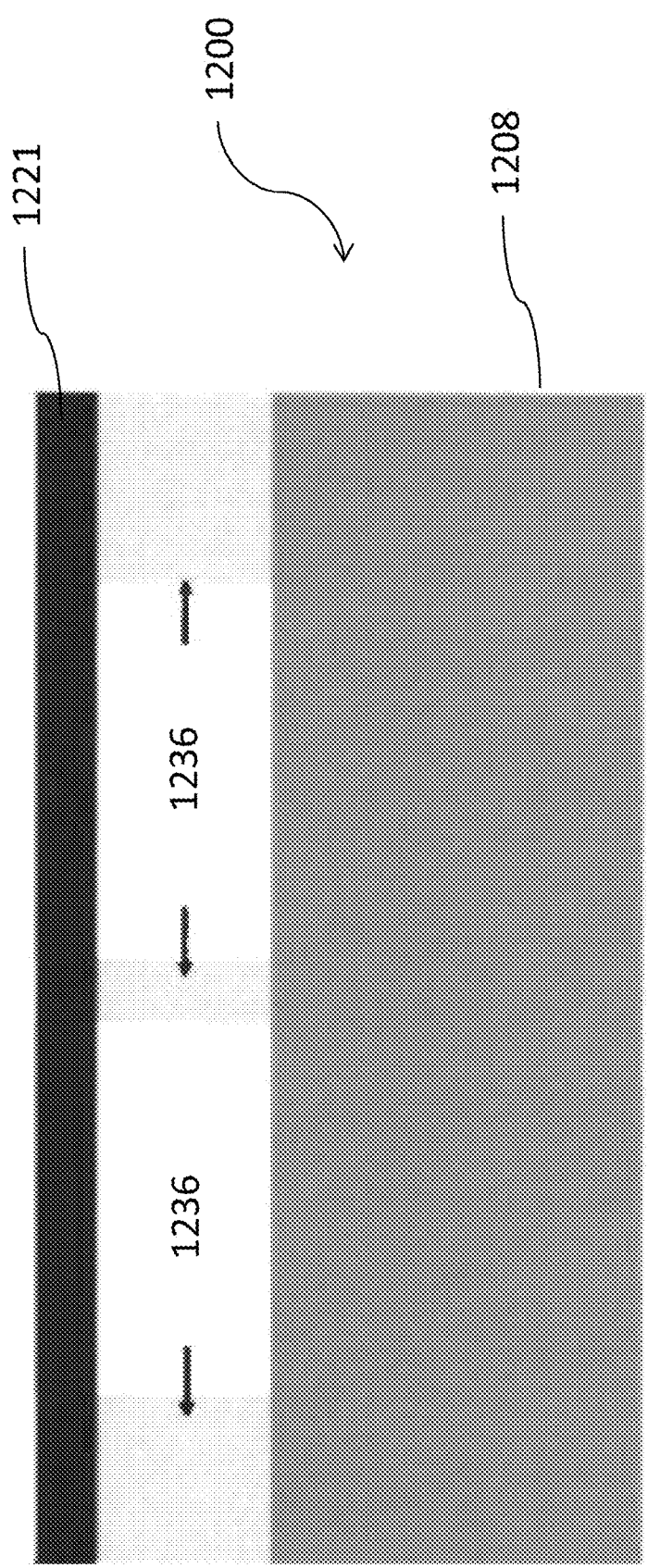
FIG. 12 is a schematic, cross-sectional view of the top surface of a silicon wafer support base implemented with a non-silicon base material (Silicon Nitride) and a slab material of Lithium Niobate.

Finally, T-guide technology may be implemented without using silicon for the base substrate that comprises the trenches and posts. If other materials for the base are used, a wider variety of refractive indices become accessible for the material to be transferred on top of the post. Materials that are especially useful as a base material include, without limitation: silicon nitride, silicon dioxide, and aluminum nitride. Practically, the base wafer could consist of a silicon support substrate followed by a sufficiently thick layer of the desired base material in order to achieve the trench depth required. Suitable "slab" materials that could be transferred on top of these bases would then include all of the same materials, plus others that are more difficult to etch and thus are better suited to the "slab" role: lithium niobate, gallium nitride, diamond, aluminum oxide, and titanium dioxide. An example implementation utilizing the particular materials of silicon nitride for the base material and lithium niobate for the slab material is depicted in FIG. 12.

Figure 2:
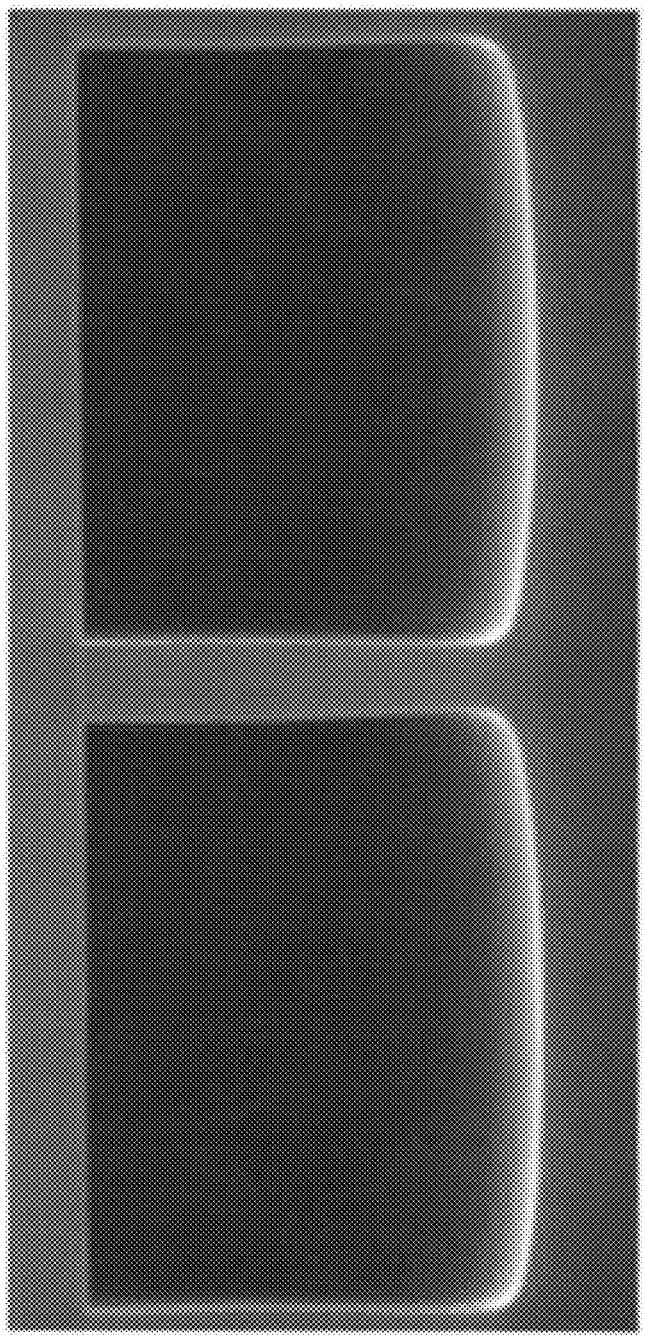
FIG. 2 is a scanning electron microscope cross-sectional image of a T-guide fabricated at CREOL.
Figure 3:
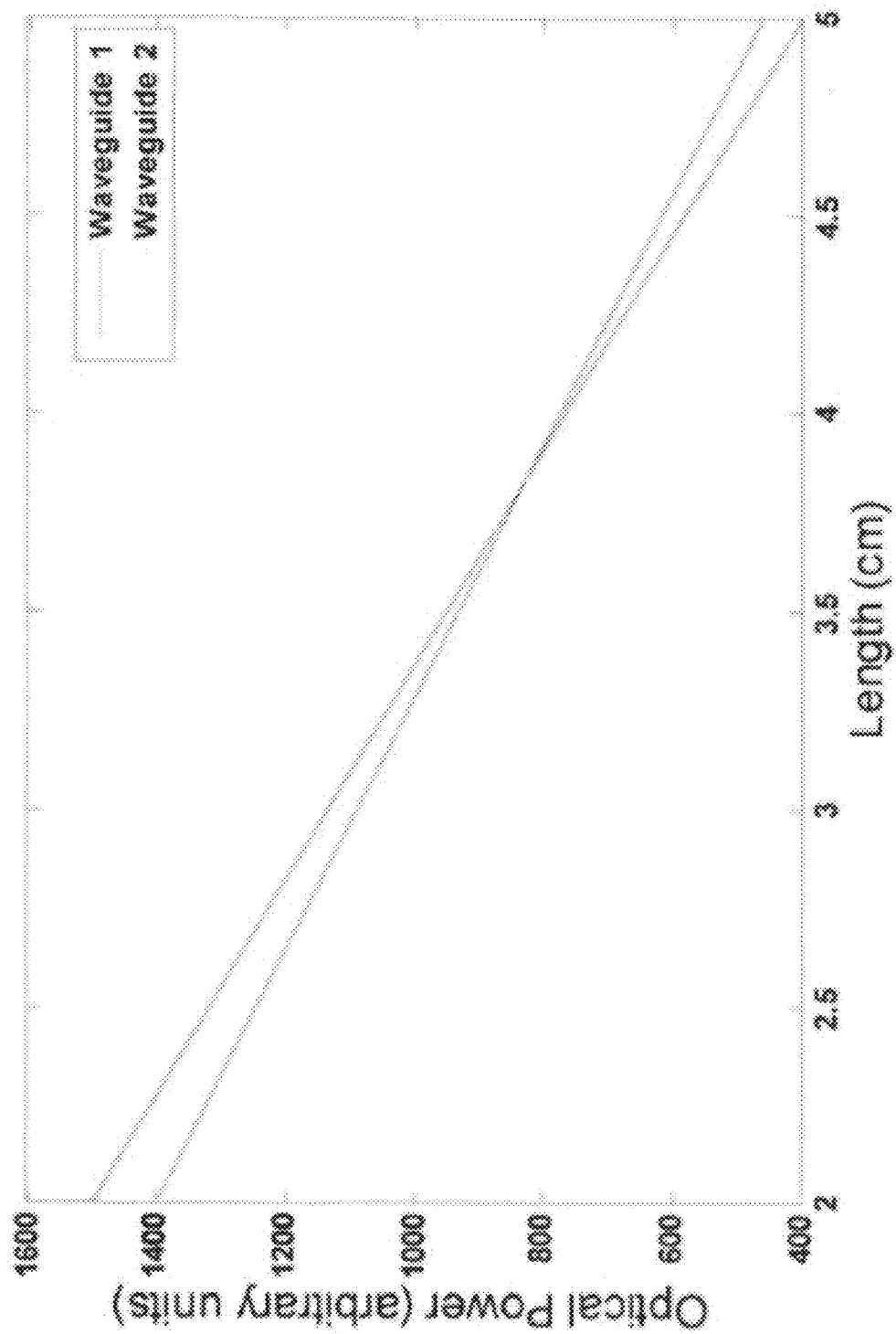
FIG. 3 is a chart of cut-back measurements of propagation loss of fabricated T-guides.

A silicon T-guide chip was fabricated (without CMP and without buried oxide removal) and tested at an optical wavelength of 3.6 microns. A cross section view through a scanning electron microscope (SEM) is provided in FIG. 2. Through measurements of waveguides of different lengths, the propagation loss in the waveguides was determined to be 1.75 dB/cm (FIG. 3), which is lower than that demonstrated in a suspended membrane silicon platform in the inventor's prior work, which can be seen in "High-Contrast, All-Silicon Waveguiding Platform for Ultra-Broadband Mid-Infrared Photonics," published by Applied Physics Letters, vol. 103, no. 15, p. 151106, October, 2013, which is incorporated herein by reference as though fully set forth in its entirety.

The embodied invention offers advantages over the alternative approaches. First, regarding robustness, the T-guide provides rigid mechanical support without compromising the benefit of an air-clad waveguide, enabling it to have dramatically higher yield and durability than membranes that are supported only at the sides. Additionally, since the T-guide and the substrate are directly connected and both comprised of silicon, which has a very high thermal conductivity, the waveguide core exhibits excellent thermal dissipation to the substrate, increasing its tolerance to optical absorption losses and variations in environmental temperature. Next, regarding optical quality, the T-guide platform supports waveguides that can be thermally oxidized for very large thicknesses, but still retain exact rectangular features thanks to the unique support of CMP process to planarize the silicon surface prior to bonding. With these very thick thermal oxidation cycles, the feature roughness can be reduced to extremely low levels, resulting in long propagation lengths for the waveguides and efficient operation.

Further, regarding simplicity of design, the method for producing T-guides always results in the same simple rectangular shape, meaning that only two design parameters must be adjusted when modifying waveguides, the post width and the slab thickness. Other waveguides that employ thermal oxidation in order to improve waveguide quality must deal with highly nonlinear changes to geometry as other parameters are changed, resulting in many iterations to validate a design. Next, regarding integration density, T-guides can be placed in close proximity to each other, limited only by the thickness of thermal oxide that is grown for the smoothening effect. This makes for more efficient use of wafer area and reduces the cost of production substantially. In addition, the optical modes in adjacent T-guides can be evanescently coupled to each other, making T-guide technology compatible with most standard integrated photonic components such as directional couplers, splitters, and resonant cavities.

Finally, regarding heterogeneous integration compatibility, after fabrication, the exposed slab surface on top of the wafer (which is perfectly flat and atomically smooth) can have other optical materials added directly via vacuum evaporation or epitaxial growth in order to modify its optical properties. Other approaches for suspended waveguide fabrication always result in irregular top-surface topologies, making them incompatible for direct deposition with conventional techniques due to non-conformal coating.

In nonlinear optics, intense optical excitation of a material results in the generation of new frequencies of light, different from that of the original "pump" light source. Typically, it requires long interaction lengths to achieve useful conversion efficiencies. The embodied T-guide platform combines wideband optical transparency, high index contrast waveguiding, low propagation losses, and simple design properties, making it an ideal platform for efficient integrated nonlinear optics in the mid-IR. It could be used to convert a laser from one commonly available wavelength into a different, more exotic one, or to broaden a pump laser's spectrum through a process known as supercontinuum generation.

From an applications standpoint, a commercial use could be for low-cost, compact "optical spectrum analyzers on a chip." An optical spectrum analyzer (OSA) allows one to ascertain the spectral features of an optical signal or the amount of power across a wide spectrum. Currently, they are implemented as bulky, free-space systems that require precision alignment and expensive, large optical components such as prisms, mirrors and lenses. The T-guide platform, with its low propagation losses and wide transparency window, could be a suitable substrate for performing many of the functions of an OSA in an integrated manner, drastically reducing its cost and potentially improving its performance due to the increased resistance to environmental factors such as vibration and temperature variations. A chip based on T-guide technology could replace numerous bulky components with one integrated system.

Another potential commercial application could be in a compact supercontinuum-generation light source. In supercontinuum generation, a pulsed pump laser is coupled into a material with some nonlinear optical response. Under the right conditions, such as when the waveguide exhibits anomalous group velocity dispersion over some spectrum, the laser can be broadened over more than an octave span, which has potential applications for medical diagnosis and remote sensing. The T-guide platform could be used as a very long path length for the nonlinear material involved in the supercontinuum generation process. An additional benefit of this technology is that it can be based on highly stable crystalline silicon, which is already thoroughly characterized and exhibits no significant changes to its structure over time, making it very reliable for such an application.

While embodiments of the present invention has been particularly shown and described with reference to certain exemplary embodiments, it will be understood by one skilled in the art that various changes in detail may be effected therein without departing from the spirit and scope of the invention as defined by claims that can be supported by the written description and drawings. Further, where exemplary embodiments are described with reference to a certain number of elements it will be understood that the exemplary embodiments can be practiced utilizing either less than or more than the certain number of elements.

What is claimed is:

1. An integrated photonics platform, comprising:
    an optical waveguide having at least two embedded air chambers that are laterally separated by a post consisting of a single material, the embedded air chambers having an upper region directly above that directly contacts the post and a lower region directly below, wherein the embedded air chambers are connected to one another by the post; and
    wherein an optical mode is confined to the upper region.

2. The photonics platform of claim 1, wherein the optical waveguide is comprised of a base wafer patterned with a mask and bonded to a donor wafer.

3. The photonics platform of claim 1, wherein the upper region has a height shorter than the lower region.

4. The photonics platform of claim 1, wherein the upper region has a height that is less than a width of the post.

5. The photonics platform of claim 1, wherein the post has a width that increases toward the lower region.

6. The photonics platform of claim 1, wherein the single material comprises silicon.

7. A method for forming an integrated photonics platform, comprising the steps of:
    forming a pattern on a surface of a base wafer;
    etching the base wafer anisotropically;
    thermally oxidizing the base wafer;
    stripping a thermal oxide from the base wafer to form at least 2 air chambers that are laterally separated by a post of the base wafer so that the post is consisting of a single material;
    bonding a donor wafer directly to the base wafer including to directly contact the post to render the air chambers embedded air chambers and to form an upper region directly above the embedded air chambers, the embedded air chambers having an upper region directly above and a lower region directly below, wherein the embedded air chambers that are connected to one another by the post; and
    removing a backside of the donor wafer terminating at an oxide layer of the donor wafer.

8. The method of claim 7, further comprising the step of removing a top layer of the thermal oxide using chemical-mechanical polishing.

9. The method of claim 7, wherein the base wafer is etched vertically with inductively-coupled plasma reactive-ion-etching.

10. The method of claim 7, wherein the thermal oxide is stripped from the base wafer through wet etching in a solution comprising hydrofluoric acid.

11. The method of claim 7, further comprising the step of treating the base wafer and the donor wafer with at least one of argon and oxygen plasma.

12. The method of claim 7, further comprising the step of applying an isotropic plasma etch to the silicon donor wafer.

13. A method for forming an integrated photonics platform, comprising the steps of:
    forming a pattern on a surface of a silicon base wafer;
    etching the silicon base wafer anisotropically with inductively-coupled plasma reactive-ion-etching;
    thermally oxidizing the silicon base wafer to form at least 2 air chambers that are laterally separated by a post of the base wafer so that the post is consisting of a single material;
    stripping silicon dioxide from the base wafer;
    bonding a silicon-on-insulator donor wafer directly to the silicon base wafer to render the air chambers embedded air chambers and to form an upper region above the embedded air chambers, the embedded air chambers having an upper region directly above and a lower region directly below, wherein the embedded air chambers are connected to one another by the post; and
    removing a backside of the silicon-on-insulator donor wafer terminating at a silicon dioxide layer of the silicon-on-insulator donor wafer.

14. The method of claim 13, wherein the pattern is formed with a polymer mask.

15. The method of claim 14, wherein etching the silicon base wafer removes horizontal silicon dioxide surfaces surrounding the polymer mask, creating trench surfaces.

16. The method of claim 15, further comprising the step of etching the trench surfaces with inductively-coupled plasma reactive-ion-etching.

17. The method of claim 13, further comprising the step of treating the silicon base wafer and the silicon-on-insulator donor wafer with oxygen plasma.

18. The method of claim 14, wherein the trench surfaces are separated by a silicon post.

* * * * *